(12) United States Patent
Dodman et al.

(10) Patent No.: US 9,259,777 B2
(45) Date of Patent: Feb. 16, 2016

(54) UNITARY CRANK SPINDLE ASSEMBLY AND METHOD OF FABRICATION

(75) Inventors: Christopher P. Dodman, Basel (CH); Stephen B. Metz, Danbury, CT (US)

(73) Assignee: CYCLING SPORTS GROUP, INC., Bethel, CT (US)

( * ) Notice: Subject to any disclaimer, the term of this patent is extended or adjusted under 35 U.S.C. 154(b) by 914 days.

(21) Appl. No.: 12/719,389

(22) Filed: Mar. 8, 2010

(65) Prior Publication Data

US 2010/0229675 A1 Sep. 16, 2010

Related U.S. Application Data

(60) Provisional application No. 61/160,397, filed on Mar. 16, 2009.

(51) Int. Cl.
| | | |
|---|---|---|
| *B21D 53/86* | (2006.01) | |
| *B21J 5/00* | (2006.01) | |
| *B21K 21/00* | (2006.01) | |
| *B62K 21/02* | (2006.01) | |
| *B62M 3/00* | (2006.01) | |
| *B62K 21/04* | (2006.01) | |

(52) U.S. Cl.
CPC . *B21D 53/86* (2013.01); *B21J 5/00* (2013.01); *B21K 21/00* (2013.01); *B62K 21/02* (2013.01); *B62K 21/04* (2013.01); *B62M 3/00* (2013.01); *B62M 3/003* (2013.01); *Y10T 74/2164* (2015.01)

(58) Field of Classification Search
CPC ........... B21D 53/86; B21K 21/00; B21J 5/00; B62M 3/00

USPC .......... 72/356, 377, 370.01, 355.2, 352, 358; 280/276, 281.1

See application file for complete search history.

(56) References Cited

U.S. PATENT DOCUMENTS

| | | | | |
|---|---|---|---|---|
| 2,182,958 | A | * 12/1939 | Bullock | ..................... 29/888.08 |
| 3,940,969 | A | 3/1976 | Princehouse | |
| 4,305,269 | A | 12/1981 | Kimura | |
| 4,704,919 | A | 11/1987 | Durham | |
| 5,299,488 | A | 4/1994 | Kadlicko et al. | |
| 5,480,359 | A | 1/1996 | Tani | |

(Continued)

FOREIGN PATENT DOCUMENTS

| | | |
|---|---|---|
| CN | 2633727 | 8/2004 |
| CN | 2654492 | 11/2004 |

(Continued)

OTHER PUBLICATIONS

EP Search Report dated Sep. 4, 2013; EP Application No. 10250369.5; Date of Completion Aug. 28, 2013.

(Continued)

*Primary Examiner* — Shelley Self
*Assistant Examiner* — Mohammad I Yusuf
(74) *Attorney, Agent, or Firm* — Cantor Colburn LLP

(57) ABSTRACT

A bicycle is provided having a unitary steering tube-crown member and a unitary crank arm-spindle member. A multistage aluminum 3D forging process is used to form the unitary members. This may allow the fabrication of components with substantially hollow interior areas to reduce weight, reduce part count while maintaining high strength and ductility. The multistage 3D forging process provided also allows the combination of multiple components into a single unitary part.

4 Claims, 53 Drawing Sheets

(56) References Cited

U.S. PATENT DOCUMENTS

| | | | |
|---|---|---|---|
| 5,609,070 | A | 3/1997 | Lin et al. |
| 5,623,856 | A * | 4/1997 | Durham .................. 74/594.1 |
| 5,921,572 | A | 7/1999 | Bard et al. |
| 6,095,542 | A | 8/2000 | Allen |
| 6,267,399 | B1 | 7/2001 | Buckmiller et al. |
| 6,286,642 | B1 | 9/2001 | Yi |
| 6,314,834 | B1 | 11/2001 | Smith et al. |
| 6,401,511 | B1 | 6/2002 | Leng |
| 6,508,002 | B1 | 1/2003 | Chiang |
| 6,612,033 | B1 | 9/2003 | Jiang |
| 6,612,599 | B2 | 9/2003 | Miyoshi |
| RE38,669 | E | 12/2004 | Voss et al. |
| 6,829,965 | B1 | 12/2004 | Mombrinie |
| 6,863,291 | B2 | 3/2005 | Miyoshi |
| 7,052,028 | B2 | 5/2006 | Chamberlain |
| 7,052,029 | B2 | 5/2006 | Chamberlain |
| 7,128,192 | B2 | 10/2006 | Fox |
| 7,181,823 | B2 * | 2/2007 | Zeng .............................. 29/530 |
| 7,216,881 | B2 | 5/2007 | Wesling |
| 7,258,040 | B2 * | 8/2007 | Valle et al. .................. 74/594.1 |
| 7,506,528 | B2 | 3/2009 | Chamberlain |
| 7,523,684 | B2 * | 4/2009 | French ....................... 74/594.1 |
| 7,543,835 | B2 | 6/2009 | Murphy et al. |
| 7,784,378 | B2 | 8/2010 | Schlanger |
| 7,900,948 | B2 | 3/2011 | Lewis |
| 7,950,681 | B2 | 5/2011 | Lewis et al. |
| 2001/0049976 | A1 * | 12/2001 | Dodman ..................... 74/594.1 |
| 2005/0217417 | A1 | 10/2005 | Uchida et al. |
| 2006/0186632 | A1 | 8/2006 | Chen |
| 2008/0011120 | A1 | 1/2008 | Lin |
| 2008/0303240 | A1 | 12/2008 | Lewis et al. |
| 2009/0160156 | A1 | 6/2009 | Yu |
| 2009/0160157 | A1 | 6/2009 | Yu |
| 2012/0042746 | A1 | 2/2012 | Nonoshita et al. |

FOREIGN PATENT DOCUMENTS

| | | |
|---|---|---|
| EP | 1120336 A2 | 1/2001 |
| EP | 1419961 A1 | 5/2004 |
| EP | 1582448 A2 | 10/2005 |
| FR | 2189251 A1 | 1/1974 |
| WO | 0232751 A2 | 4/2002 |

OTHER PUBLICATIONS

EP Search Report dated Sep. 3, 2013; EP Application No. 10250368.7; Date of Completion Aug. 21, 2013.

International Search report of the International Application No. PCT/US2014/020271 mailed Jun. 16, 2014.

Written Opinion of the International Searching Authority for International Application No. PCT/US2014/020271 mailed Jun. 16, 2014.

EP Office Action for Application No. 10 250 368.7-1755 dated Apr. 13, 2015; 4 pages.

Non-Final Office Action for U.S. Appl. No. 13/795,075 dated May 29, 2014; 20 pages.

* cited by examiner

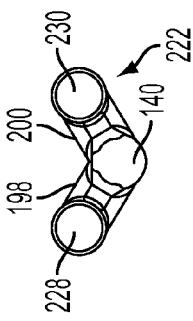
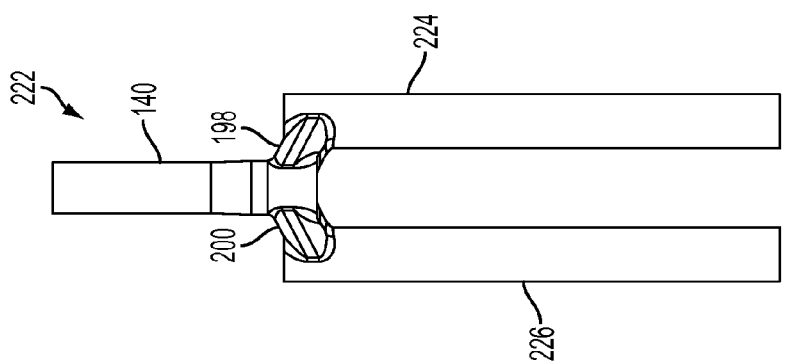
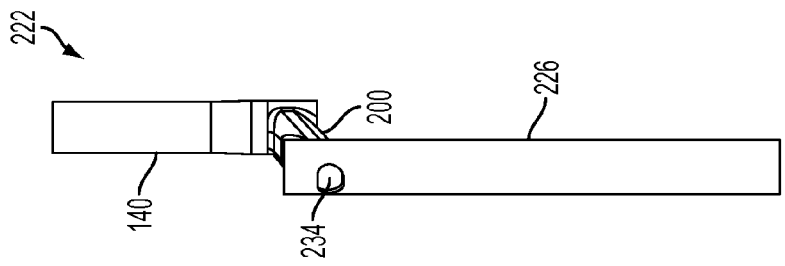
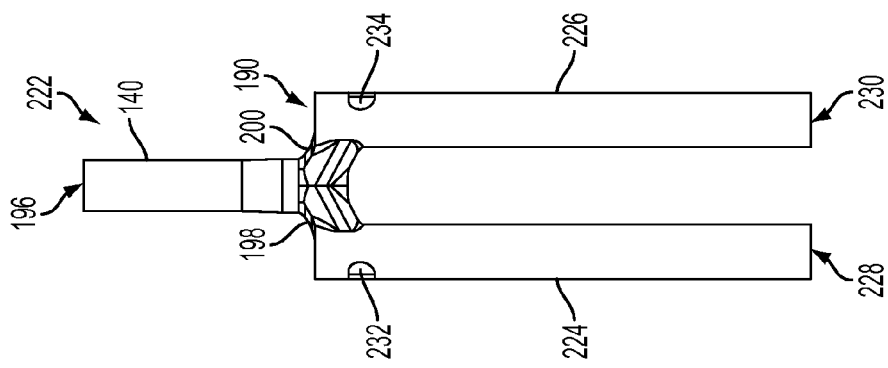

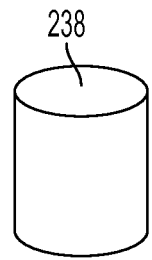
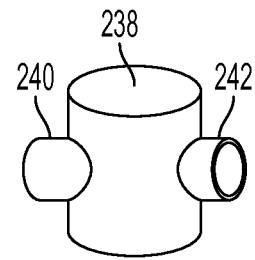
FIG. 31  FIG. 32
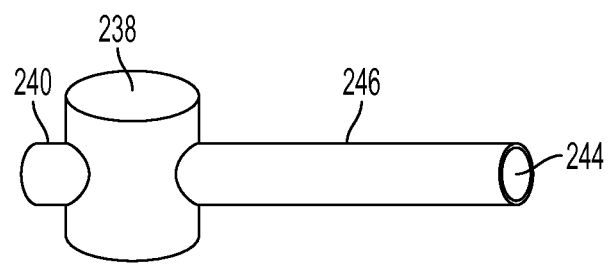
FIG. 33

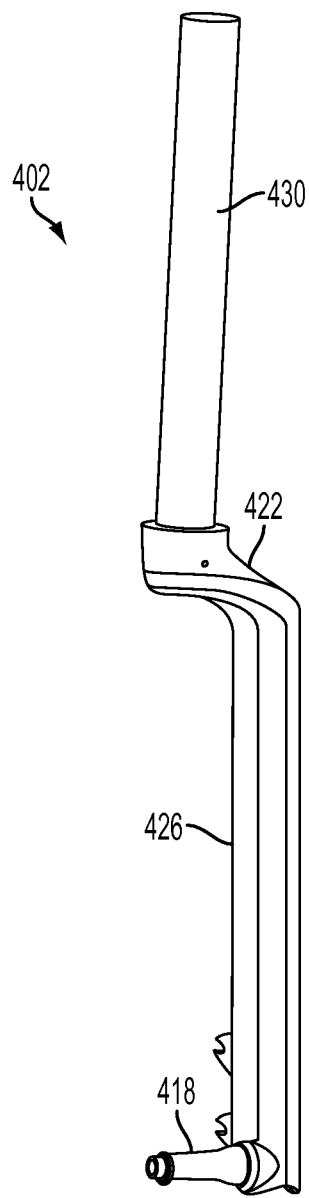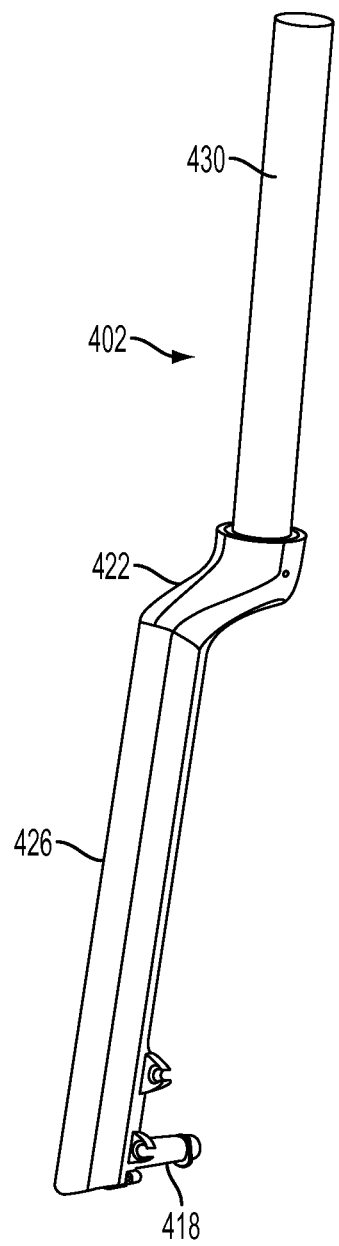
FIG. 49
FIG. 50

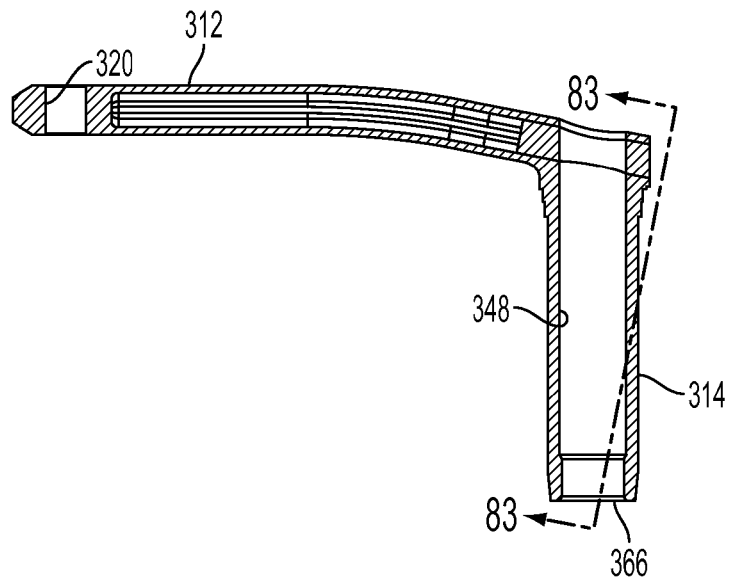
FIG. 83
FIG. 84
FIG. 85

UNITARY CRANK SPINDLE ASSEMBLY AND METHOD OF FABRICATION

CROSS-REFERENCE TO RELATED APPLICATIONS

This application is a non-provisional application of U.S. Patent Provisional Application No. 61/160,397 entitled "UNITARY CROWN FORK ASSEMBLY AND METHOD OF FABRICATION" filed Mar. 16, 2009, which is hereby incorporated by reference in its entirety.

BACKGROUND OF THE INVENTION

The subject matter disclosed herein relates to a bicycle and in particular to a bicycle having a unitary crank spindle component.

Bicycles, such as mountain bicycles and all-terrain bicycles encounter a variety of terrains and environmental conditions during operation. Therefore, components used in bicycles need to withstand impacts caused by bumps, rocks, holes and the like. This results in the components being made from strong materials to avoid damage. However, other factors, such as weight for example, may also determine material selection since a lighter bicycle makes less of an impact on the riders endurance.

To accommodate these factors, tradeoffs are made in the selection of material and design of components. It may be desirable to have a component that absorb energy, such as the front fork assembly for example, be made from high strength steel. However, it may be undesirable to incur the additional weight of a steel component. To achieve a high strength and low weight fork assembly, composite materials, such as carbon composites for example, have been proposed. While forks made from these materials perform well, they tend to be expensive to manufacture. Further, while composite materials are strong, they are also less elastic than traditional metal materials. As a result, higher performing composite materials are used, which further increases the cost.

Bicycles include a number of subassemblies, such as the front steerer tube-fork or the crank-spindle assemblies for example. Each of these subassemblies is typically composed of a number of components. For example, the front fork assembly includes a steerer tube, a crown, and one or more suspension forks. While the fabricating individual components may be desirable to allow flexibility in material selection and design of the components, it does adversely impact the manufacturing costs of the bicycle.

Accordingly, while existing bicycles are suitable for their intended purposes, there remains a need for improvements, particularly in the manufacturing of unitary components to reduce the number of components while maintaining desired performance.

BRIEF DESCRIPTION OF THE INVENTION

According to one aspect of the invention, a bicycle is provided having a wheel and a head tube. A unitary fork is operably coupled to the wheel. The fork includes a steerer tube operably coupled to the head tube, the steerer tube includes a first bore having a first axis. The fork further includes a crown contiguously extending from one end of the steerer tube. Wherein the fork is made from a three-dimensional (3D) forged metal material.

According to another aspect of the invention, a method of fabricating a unitary bicycle fork is also provided. The method includes the step of performing a first forging on a billet to form a first projection. A first 3D forging operation is performed on the billet extending the first projection to form a crown. A second 3D forging operation is performed on said billet to form a steering tube, wherein the second projection is substantially perpendicular to the first projection.

According to yet another aspect of the invention, a unitary bicycle fork is provided having a crown formed by a first 3D forging of a metal billet to form a first projection. A steerer tube is extended from the crown, the steerer tube formed by a second 3D forging, where the steerer tube has a first axial bore therein.

According to yet another aspect of the invention, a crank assembly for a bicycle is provided. The crank assembly includes a unitary first portion. The first portion having a first arm with a first solid end and an first axial bore extending from the first end to a second end. The first portion further having a spindle extending substantially perpendicular from the arm adjacent the second end. The spindle has a second axial bore extending into the first arm adjacent the second end, the second axial bore being arranged to intersection with the first axial bore. A second portion is provided having a second arm with a third solid end and an third axial bore extending from the third end to a fourth end, the second portion being operably coupled to the spindle adjacent the fourth end.

According to yet another aspect of the invention, a method of fabricating a unitary bicycle crank-arm and spindle is provided. The method includes forming a first elongated arm by 3D forging. The first arm having a solid first end and a first axial bore, the axial bore having a first opening at a second end of the first arm opposite the first end. A first projection is formed on the first arm adjacent the second end. Extending the first projection forms a spindle and a second axial bore in the first projection by 3D forging. The arm is then bent such that the solid end is substantially perpendicular to the first projection.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7-10 are an illustration of a unitary steerer tube-crown-blade embodiment for the bicycle of FIG. 1;

FIG. 31-38 are an illustration of a process for fabricating a unitary steerer tube-crown-fork in accordance with an embodiment of the invention;

FIG. 49-50 are perspective view illustrations of the finished steerer tube-crown-fork of FIG. 48;

FIG. 81-87 are an illustration of the unitary crank-arm and spindle member of FIG. 60 with secondary operations completed;

The detailed description explains embodiments of the invention, together with advantages and features, by way of example with reference to the drawings.

DETAILED DESCRIPTION OF THE INVENTION

Figure 1:
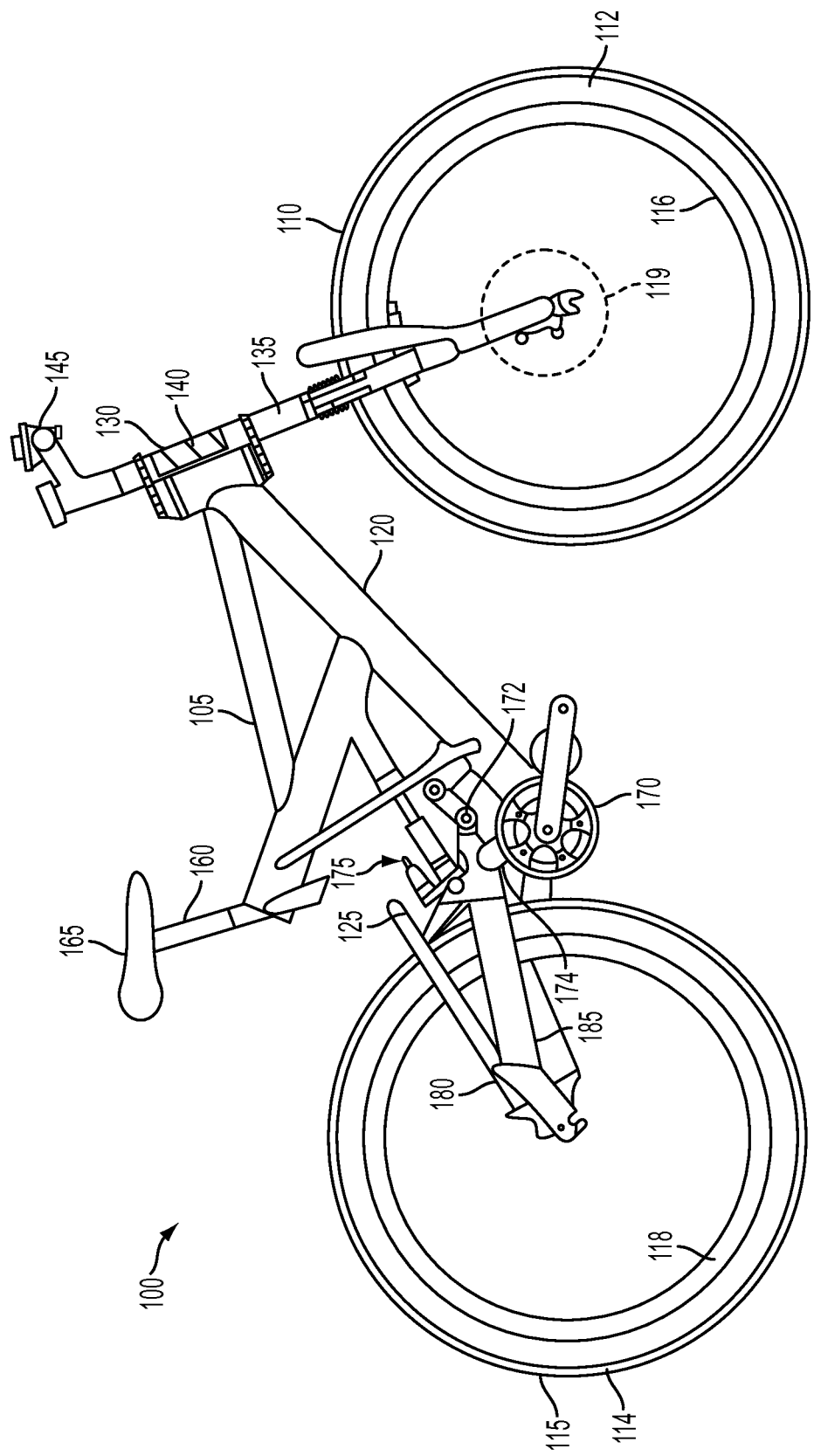
FIG. 1 is a side plan view illustration of a bicycle in accordance with an embodiment of the invention.

FIG. 1 is an exemplary embodiment of a bicycle 100 having a bicycle frame 105 configured to receive front 110 and rear 115 wheels. Each wheel includes an inflatable tire 112, 114 which is supported by a rim 116, 118, respectively. The frame 105 includes a front section 120 and a rear section 125. The front section 120 includes a head tube 130 that is configured and dimensioned to receive a front assembly 135 and to allow a rotational degree of freedom between the head tube 130 and a steerer tube 140 in the front assembly 135. The front assembly 135 couples the front section 120 to the front wheel 110. As will be discussed in more detail below, the front assembly 135 may be provided in several different embodiments, including but not limited to: a unitary steerer tube-crown-2-blade rigid fork arrangement; a unitary steerer tube-crown-single rigid fork arrangement; a unitary steer tube-crown arrangement; a unitary steerer tube-crown-2-blade suspension fork arrangement; and a unitary steerer tube-crown-1-blade suspension fork arrangement.

A handle bar 145 is coupled to the steerer tube 140 to allow the rider to rotate the front wheel 110 via the front assembly 135. The handle bar 145 typically has grips and hand brake actuators (not shown). On the opposite end of the frame front section 120, a vertically oriented rear seat support 160 is fixedly attached to at least one of the front section 120 and the rear section 125 provides support for seat 165. A crank assembly 170 is mounted to the front section 120 below the seat 165. As will be discussed in more detail below, the crank assembly 170 includes a first portion having a first arm and an integral spindle extending therefrom. A second arm is coupled to the spindle opposite the first arm. Coupled to the ends of the crank arms are pedals (not shown). A rear wheel gear assembly (not shown) is coupled to the crank assembly 170 via a chain or other suitable member.

The rear section 125 is coupled to the front section 120 by a pair of linkages 172, 174 and a rear suspension system 175. The rear section 125 includes an upper tube 180 and a lower tube 185 that connect the rear wheel 115 to the front section 120. It should be appreciated that the linkages 172, 174 and rear suspension 175 pivot, allowing the rear section 125 to move independently in the same plane as the front section 120. This type of bicycle, sometimes referred to as a full suspension type, provides energy absorption and damping for both wheels 110, 115 of the bicycle 100. In an alternative embodiment, the rear suspension 175 may be omitted, creating a bicycle type sometimes referred to as a hard tail, and the rear section 125 would be fixedly attached to the front section 120.

Figure 2:
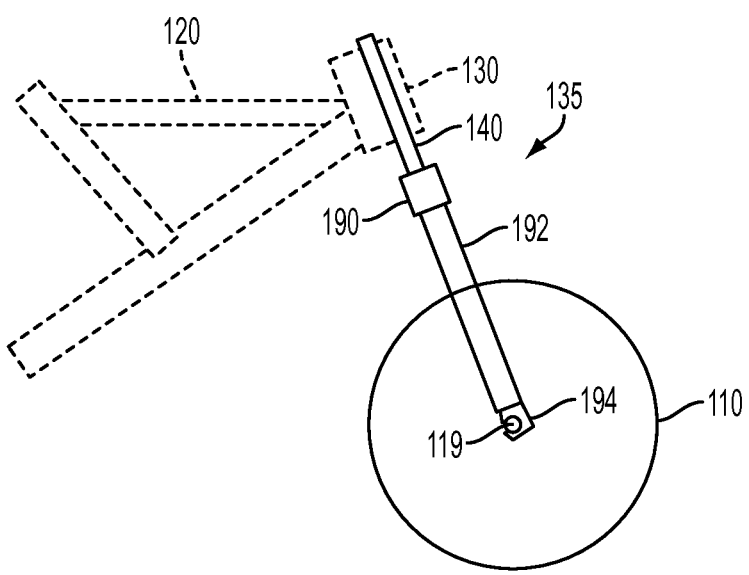
FIG. 2 is a partial side plan view illustration of the bicycle of FIG. 1.

Referring now to FIG. 2, the front assembly 135 will be described. The front assembly 135 includes a steerer tube 140 that is coupled to rotate within the head tube 130. A crown 190 extends from the bottom of the steerer tube 140 to provide an interface with a fork portion 192. Opposite the crown 190, dropouts 194 are coupled to the fork portion 192. The dropouts 194 include a slot that is sized to receive an axle 119 of front wheel 110. As will be discussed further below, the fork portion 192 may be coupled on both sides of the front wheel 110. In this embodiment, a single suspension system may be incorporated, or each side of the fork portion 192 may have a separate suspension system. The fork portion 192 with suspension may also be arranged on only one side of the bicycle (still referred to as a "fork" even though one "leg" or "blade" is absent), such as the left side for example, which is sometimes referred to as a "lefty."

During operation, the front assembly 135 absorbs a large amount of energy due to impacts on the front wheel 110. As such, it is desirable for the front assembly 135 to be both strong enough to withstand the impacts, ductile enough to avoid damage from the impacts and also be light in weight. An embodiment of a unitary and monolithic steerer tube-crown 195 is illustrated in FIGS. 3-6. As used herein, the terms "unitary" and "monolithic" refer to the use of a single integral, seamless and contiguous material to form multiple functional parts of a component. In the exemplary embodiment, the components of the front assembly 135 are formed from an aluminum material such as but not limited to 6061-T6, 7075-T6, 7050-T73, 2024, 2014 or 6069 aluminum alloys.

Figure 3:
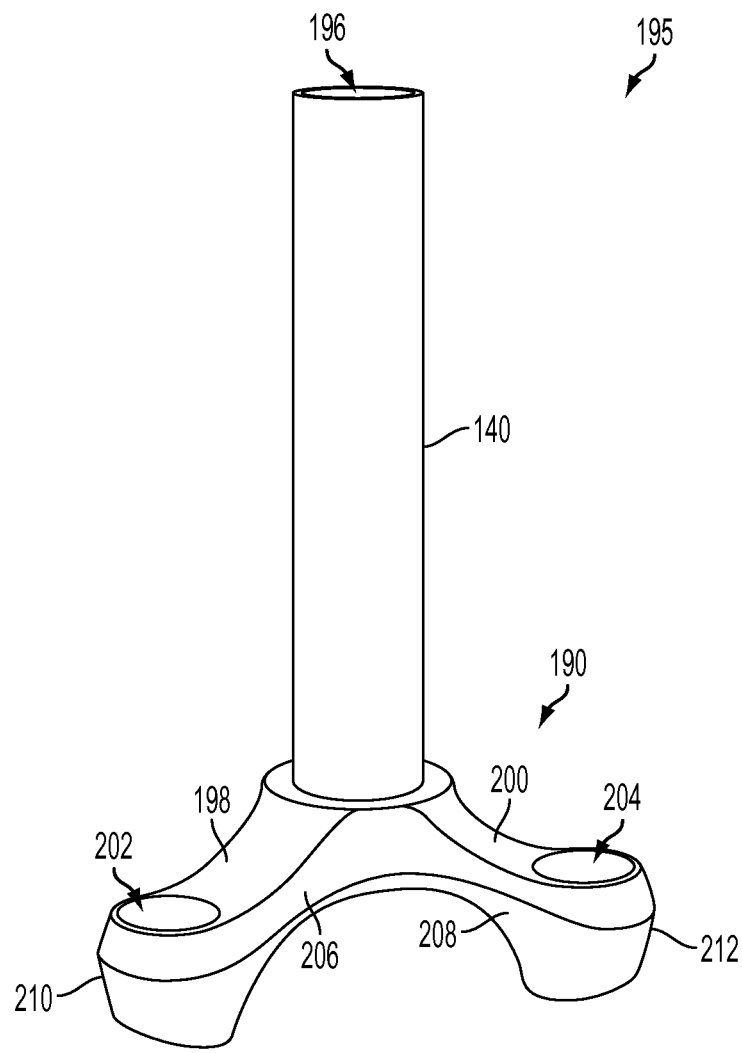
FIG. 3 is a perspective view illustration of unitary steerer tube-crown embodiment for the bicycle of FIG. 1.

In the embodiment shown in FIG. 3, the unitary steerer tube-crown 195 includes a steerer tube 140 having an axial bore 196. A crown 190 extends from one end of the steerer tube 140 with a first projection 198 and a second projection 200. The projections 198, 200 each include an arm portion 206, 208 that extends on an angle away from the steerer tube 140 and terminate in a flange 210, 212. An opening 202, 204 is formed in each flange 210, 212 that is sized to receive a suspension fork. The projections 198, 200 extend on an angle relative to the axis of the steerer tube 140.

The unitary steerer tube-crown 195 is formed from a metal, such as aluminum including but not limited to 6061-T6, 7075-T6, 7050-T73, 2024, 2014 or 6069 aluminum alloys for example, by three-dimensional (3D) forging. Aluminum provides advantages over composite type materials in that it is a high strength and ductile material and is also relatively lightweight. As will be discussed in more detail below, 3D forging allows the forming of metallic articles such that, the article is hollow, while the interior and the exterior walls may be bent in any of the three dimensional directions.

Figure 4:
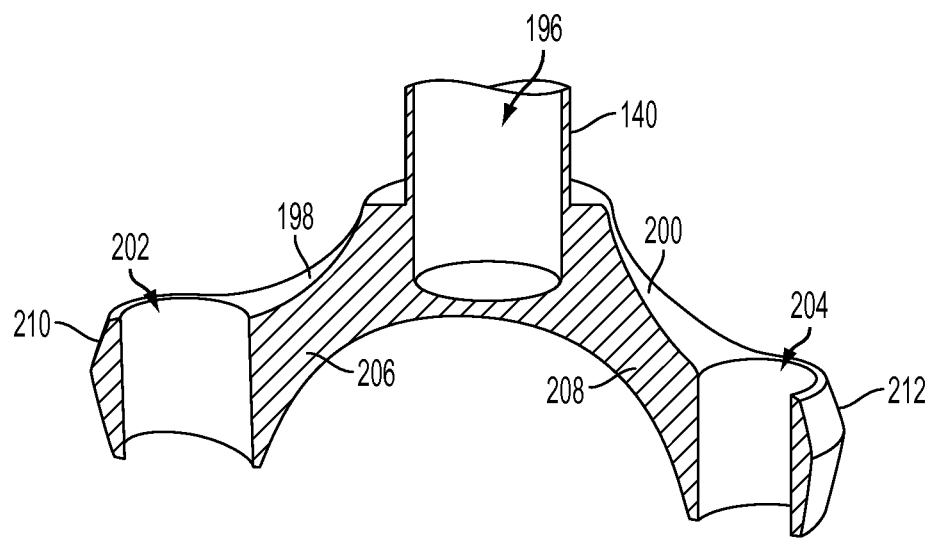
FIGS. 4-6 are perspective sectional view illustrations of embodiments of the unitary steerer tube-crown of FIG. 3.
Figure 5:
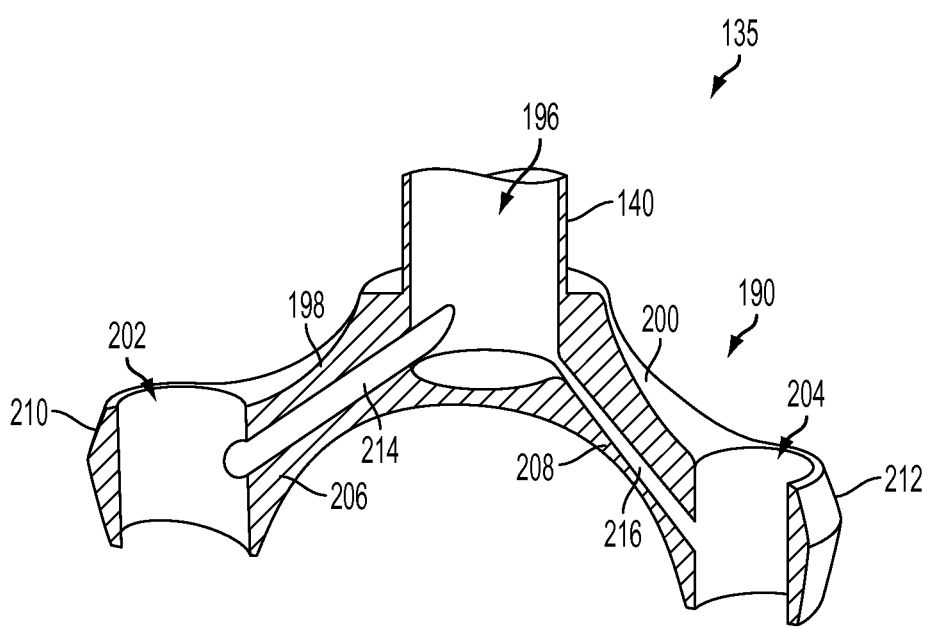

The unitary steerer tube-crown 135 may have projections 198, 200 that are solid such as is illustrated in FIG. 4. As discussed above, it is desirable to lower the weight of components on the bicycle 100. Another embodiment of the unitary tube-crown 135 is shown in FIG. 5. In this embodiment, bores 214, 216 are formed in the arms 206, 208 between the openings 202, 204 and the axial bore 196. It should be appreciated that the bores 214, 216 reduce the weight of the unitary steerer tube-crown 135. In the embodiment of FIG. 5, the bores 214, 216 are formed after the forging of the unitary steerer tube-crown 135 via the openings 202, 204 by a machining operation.

Figure 6:
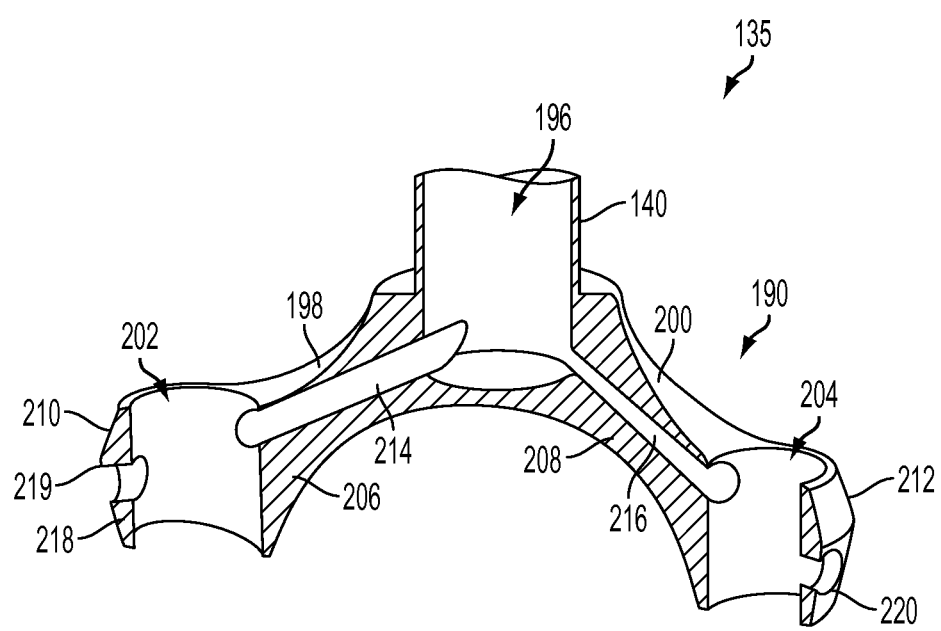
Figure 11:
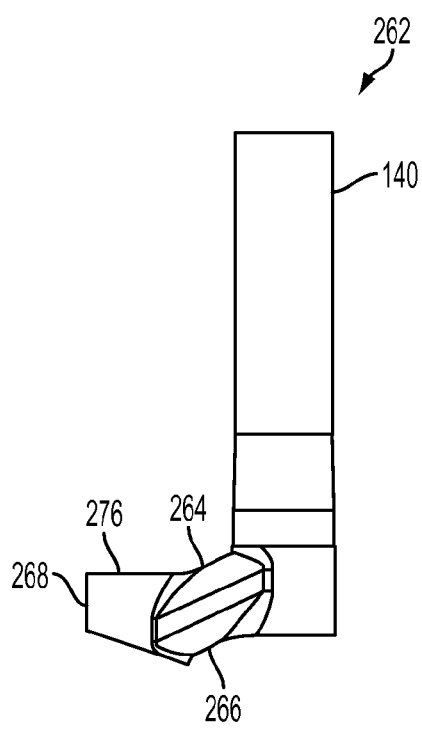
FIG. 11-16 are an illustration of another unitary steerer tube-crown embodiment for the bicycle of FIG. 1.
Figure 12:

Another embodiment of the unitary steerer tube-crown 135 is shown in FIG. 6. In this embodiment, a third bore 218 is formed between an end 219 of the flange 210 and the opening 202. Similarly, a fourth bore 220 is formed between an end 222 of flange 212 and the opening 204. In one embodiment, the third bore 218 and the fourth bore 220 are coaxial with the bore 214 and bore 216 respectively. In another embodiment, the bores 218, 214 are formed in the same machining operation and the bore 220, 216 are formed in the same machining operation.

Another embodiment of a unitary and monolithic steerer tube-crown-blade 222 is illustrated in FIGS. 7-10. Similar to the unitary steerer tube-crown 135, the unitary steerer tube-crown-blade 222 includes a steerer tube 140 having an axial bore 196. A crown 190 having a first projection 198 and a second projection 200 extend from the steerer tube 140. A first blade 224 and a second blade 226 extend from the projections 198, 200 respectively in the direction away from the steerer tube 140. In one embodiment, the axis of the blades 224, 226 is substantially parallel to the axis of the steerer tube 140. The blades 224, 226 each include an axial bore 228, 230 that is open on an end opposite the crown 190. In one embodiment, a bore 232 is formed through the outside of the blade 224 and a bore 234 is formed through the outside of blade 226. It should be appreciated that the bores 232, 234 may extend through the first projection 198 and second projection 200 into the axial bore 196, similar to the embodiment illustrated in FIG. 6. Similar to above, the unitary steerer tube-crown-blade 222 is formed from a metal, such as aluminum including 6061-T6, 7075-T6, 7050-T73, 2024, 2014 or 6069 aluminum alloys for example, by three-dimensional (3D) forging.

Similar to the embodiments illustrated in FIGS. 2-10, a unitary and monolithic steerer tube-crown-fork 262 providing for a single fork portion 192 may be formed by 3D forging as shown in FIGS. 11-28. In the embodiment shown in FIGS. 11-16, steerer tube-crown-fork 262 includes a steerer tube 140 with a crown 264 extending from one end. The crown 264 has a single projection 266 with a single flange 268 on an end opposite the steerer tube 140. The flange 268 includes an opening 270 that is sized to receive a suspension fork (not shown). In this embodiment, the flange 268 also has surface 272 that is on an angle 274 relative to a top surface 276. The angled surface 272 provides a relief that allows a bore 278 to be formed in the projection 266. As discussed above, the bore 278 assists in reducing the weight of the steerer tube-crown-fork 262.

The embodiment shown in FIGS. 17-22 illustrates a unitary steerer tube-crown-fork 262 having a steerer tube 140, a crown 264 with a projection 266. In this embodiment, a flange 278 is arranged on one end of the projection 266. The flange 278, includes a lower surface 280 and an upper surface 282 that are substantially parallel, and generally perpendicular to the axis' 284, 288 of the bore 196 and opening 270 respectively. The flange 278 is configured to extend a short distance from the lower surface 288 of the steerer tube 140. This arrangement provides a larger surface area in the opening 270 of flange 278. A larger surface area may be desirable to strengthen the connection between the unitary steerer tube-crown-fork 262 and a suspension fork (not shown) for example. Since the lower surface 280 extends further, a bore 290 may be formed through the outside diameter of the flange 278. A second bore 292 is also formed in the projection 266 to further reduce weight. It should be appreciated that the bores 290, 292 may be formed in the same operation and have the same general shape, or may have different sizes and/or shapes.

The embodiment shown in FIGS. 23-28 illustrates a unitary steerer tube-crown-fork 262 having a steerer tube 140, a crown 264 with a projection 266. In this embodiment, a blade 294 extends from the end of the projection 266 in a direction substantially away from the steerer tube 140. The blade 264 includes an opening 296 that extends therethrough. The blade 264 forms part of the suspension fork (not shown) that connects the unitary steerer tube-crown-fork 262 to the wheel 110. It should be appreciated that the blade 264 may also be tapered to form a rigid fork as discussed in more detail below. Similar to the embodiment above, a first bore 290 may be formed in the outer diameter of the blade 264 and a second bore 292 may be formed in the projection 266 as discussed above.

Figure 13:
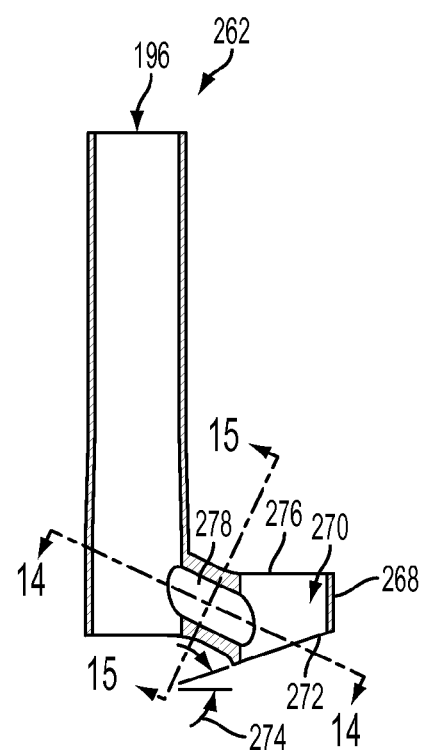
Figure 14:
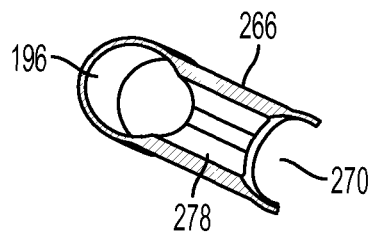
Figure 15:
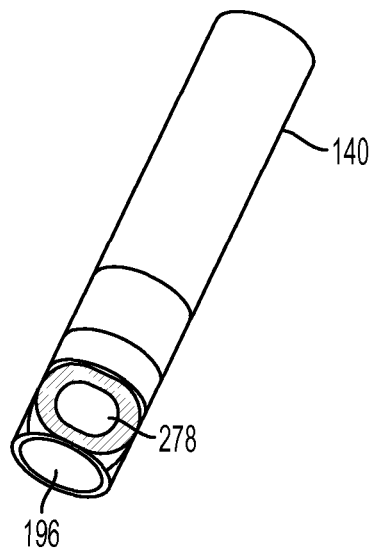
Figure 16:
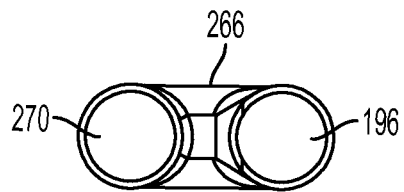
Figure 19:
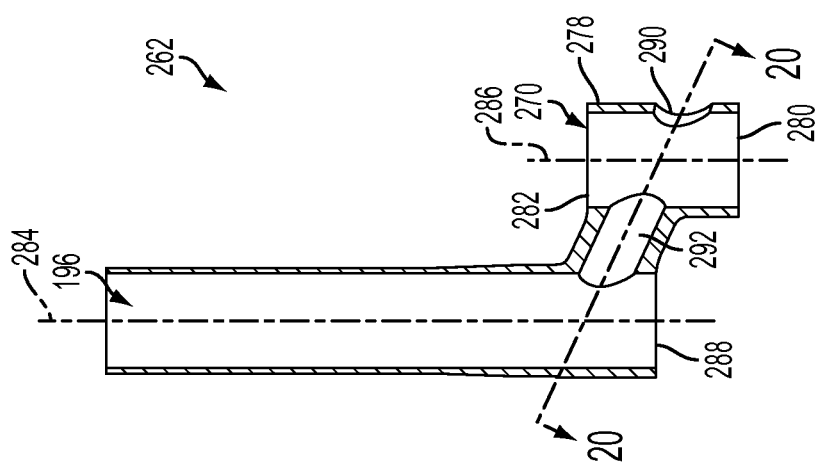
FIG. 17-22 are an illustration of another unitary steerer tube-crown embodiment for the bicycle of FIG. 1.
Figure 18:
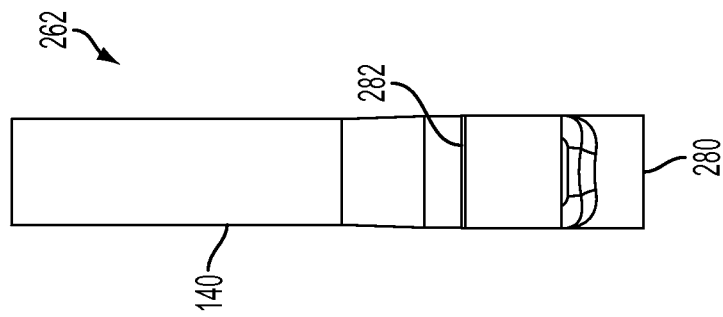
Figure 17:
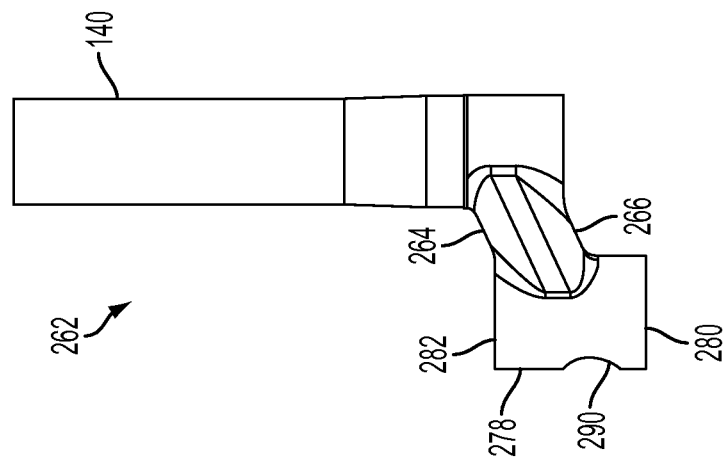
Figure 20:
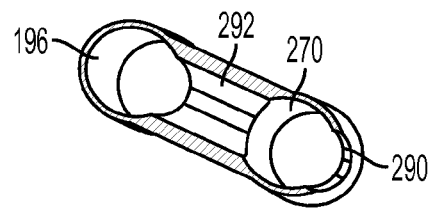
Figure 21:
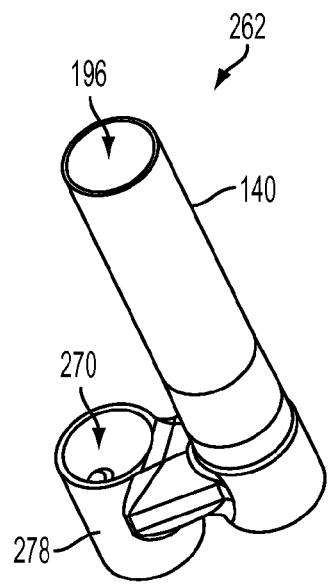
Figure 22:
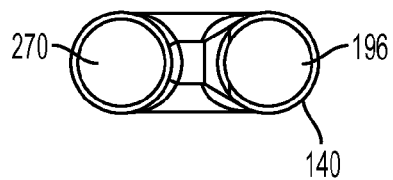
Figure 25:
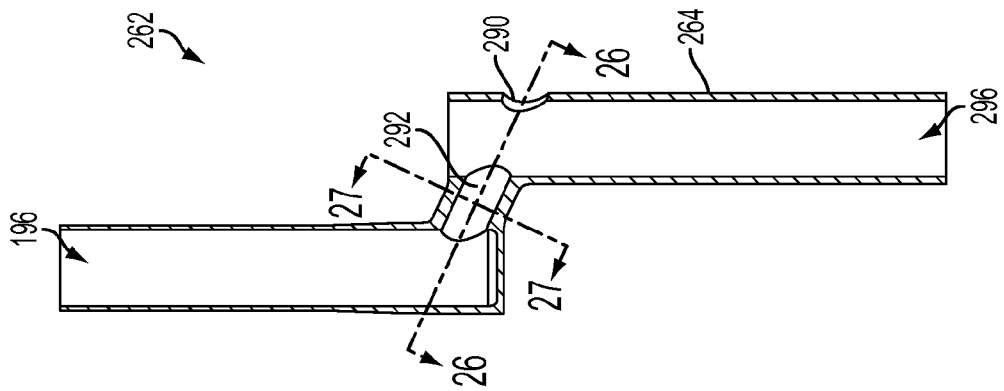
FIG. 23-28 are an illustration of another unitary steerer tube-crown-blade embodiment for the bicycle of FIG. 1.
Figure 24:
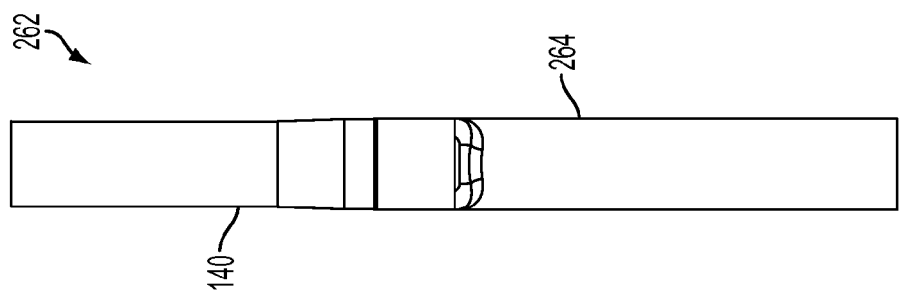
Figure 23:
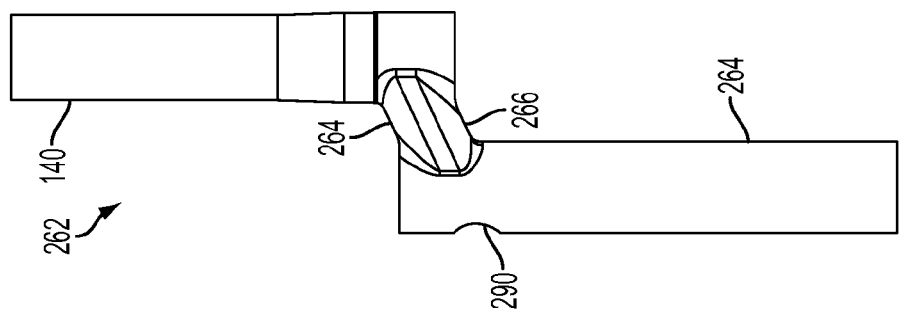
Figure 26:
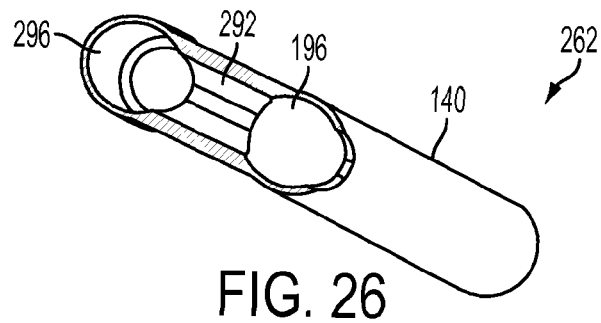
Figure 27:
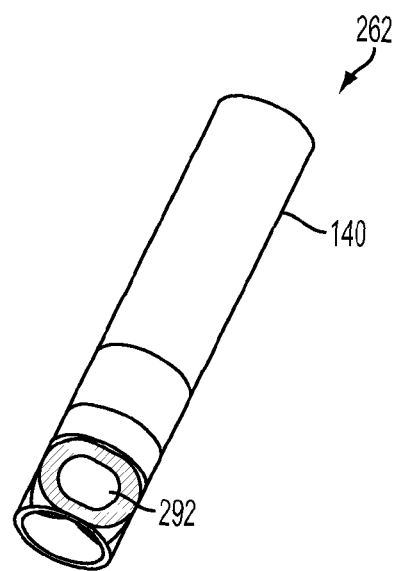
Figure 28:
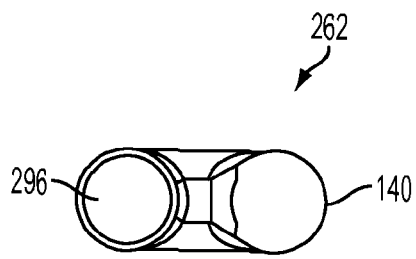

In some embodiments, the steerer tube 140 includes a bore 196. The bore 196 may be a through bore, such as shown in the embodiments of FIG. 13 and FIG. 19 for example. The bore 196 may have a closed end, sometimes referred to as a blind hole, as shown in the embodiments of FIGS. 4-6 and FIG. 25 for example. Similarly, the blade 224, 226, 294 and flange 210, 212, 268 may have a through opening 202, 204, 270, 296 as illustrated in FIGS. 3-6 and FIGS. 11-28. The opening 202, 204, 270, 296 may also have a closed end as shown in FIG. 30.

Figure 29:
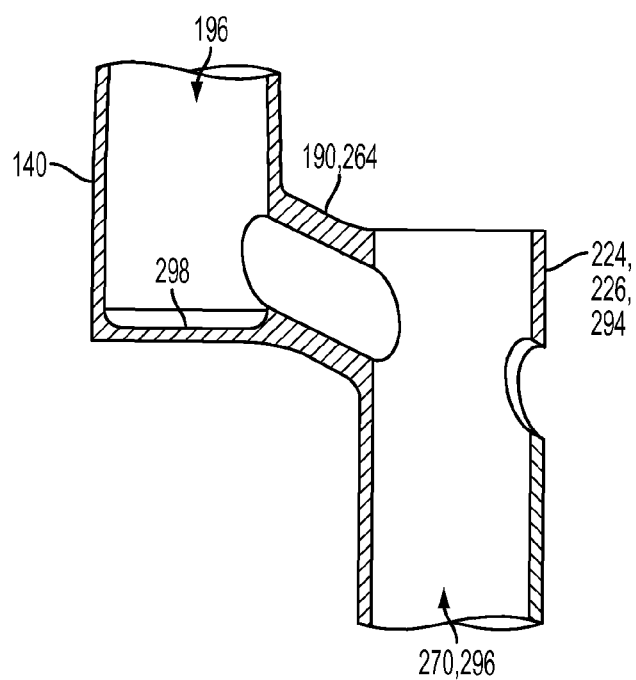
FIG. 29-30 are an illustration of another embodiments for a unitary steerer tube-crown-blade or unitary steerer tube-crown for the bicycle of FIG. 1.
Figure 30:
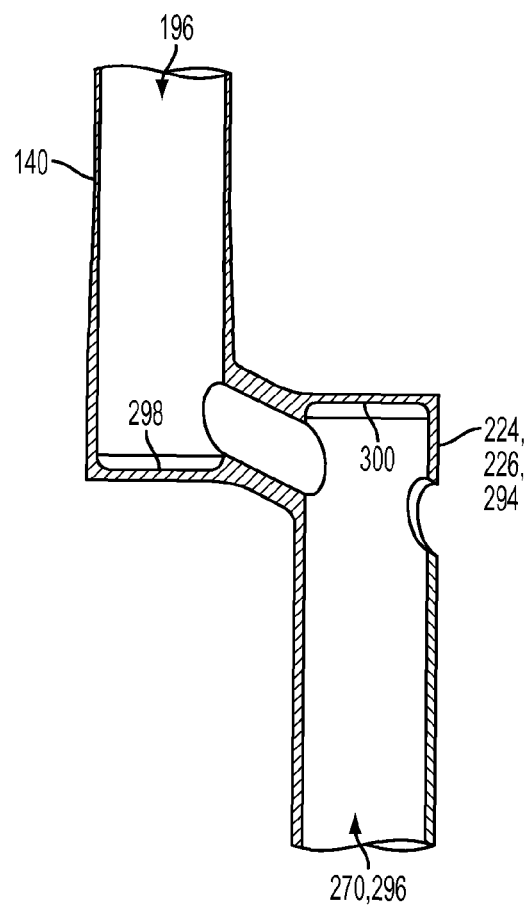

With reference to FIG. 29 and FIG. 30, the different embodiments for end configurations of the steerer tube 140, blade 224, 226, 294 and flange 210, 212, 268 will be discussed. As mentioned above, the bore 196 may have a closed end 298 adjacent the crown 190, 264. In the exemplary embodiment, the closed end 298 may be formed during the 3D forging process. The closed end 298 may also be formed by secondary operations, such as by forming a through bore initially and secondarily welding a member over the end for example. By leaving the end 298 of the bore 196 closed, advantages may be gained in providing a stronger and stiffer structure. It should be appreciated that in some embodiments, an open end of bore 196 may be desired to provide a lower weight.

Similar to bore 196, the opening 202, 204, 270, 296 may also have a closed end 300. In the exemplary embodiment, the closed end 300 is formed during the 3D forging process of the blade or flange. The closed end 300 may also be formed by secondary operations, such as by forming a through bore initially and secondarily welding a member over the end for example. Similar to closed end 298, by having closed end 300, advantages may be gained in providing a stronger and stiffer structure. It should be appreciated that in some embodiments, an open end of opening 202, 204, 270, 296 may be desired to provide a lower weight or for the installation of spring and damping components for suspension.

It should also be appreciated that the steerer tube 140, blade 224, 226, 294 and flange 210, 212, 268 may be arranged with any combination of open ends and closed ends 298, 300 depending on the desired performance for the end application without deviating from the intended scope of the claimed invention. Similarly, the projections 198, 200, 266 may include a bore, or may be solid depending on the desired performance for the end application without deviating from the intended scope of the claimed invention.

It should further be appreciated that while the embodiments herein describe portions of the unitary steerer tube-crown 135, steerer tube-crown-blade 222, and steerer tube-crown-fork 262 as being generally cylindrical, such as the blades 224, 226 and the steerer tube 140 for example. This is for exemplary purposes and other shapes may also be suitable or desirable without deviating from the intended scope of the claimed invention.

Turning now to FIGS. 31-38, a method of forming a unitary steerer tube-crown-fork 236 using a multistage three-dimensional ("3D") forging is described. The unitary steerer tube-crown-fork 236 is similar to the steerer tube-crown-blade 222 except the suspension fork is replaced with a rigid leg. The unitary steerer tube-crown-fork 236 forms a rigid connection between the wheel 110 and the handlebar 145. It should be appreciated that the multistage 3D forging method of forming the unitary steerer tube-crown-fork 236 may also be used to form the unitary steerer tube-crown 135 and steerer tube-crown-blade 222.

Figure 34:
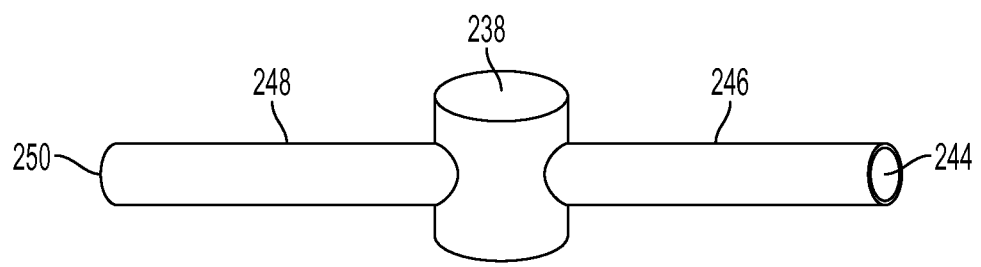

The method starts with a billet 238, formed from a metal such as aluminum including 6061-T6, 7075-T6, 7050-T73, 2024, 2014 or 6069 aluminum alloys for example, as illustrated in FIG. 31. The billet is then forged to form a first projection 240 and a second projection 242 as illustrated in FIG. 32. Next, the forged billet 238 is processed using a 3D forging process to extend the second projection 242 to form an elongated second projection 246 (FIG. 33). During this first 3D forging, a bore 244 is formed in the elongated projection 246. Similarly, using a second 3D forging process, the first projection 240 is extended to form an elongated projection 248 and a bore 250 (FIG. 34). As will be made clearer below, the elongated projections 246, 248 form the fork legs (or the blades 224, 226 in the embodiment of the unitary steerer tube-crown-blade 222).

Figure 35:
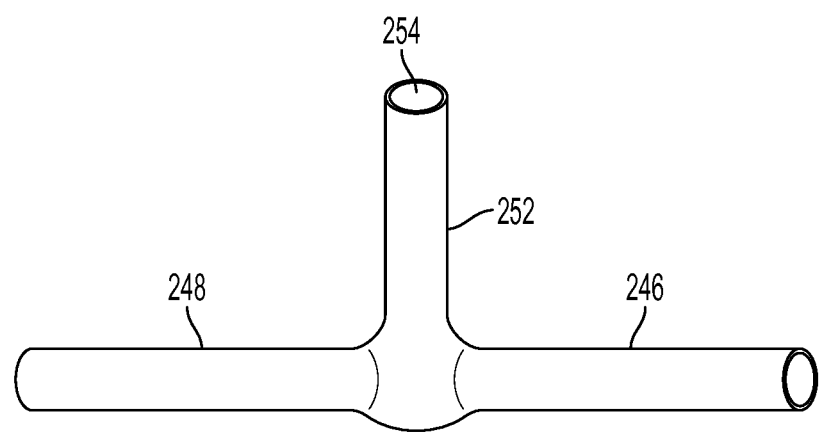
Figure 36:
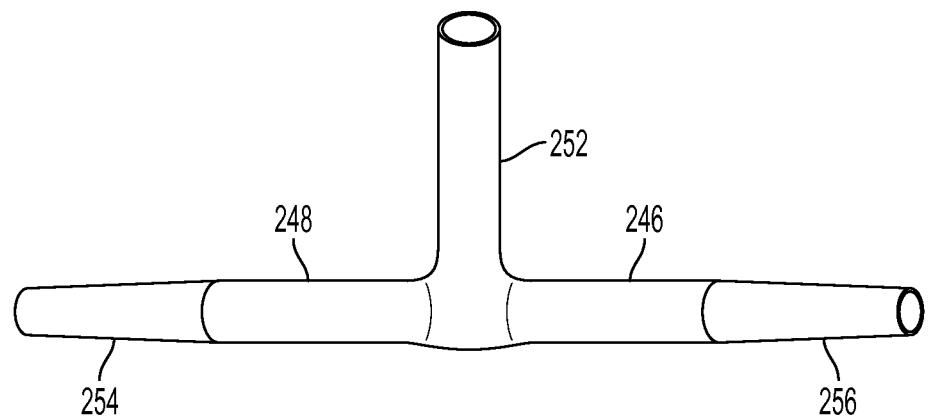

With the two elongated projections 246, 248 formed, the billet is processed using a third 3D forging step to form an elongated third projection 252 with a bore 254 (FIG. 35). The third projection 252 extends from the end of the billet 238 in a direction substantially perpendicular to the elongated projections 246, 248. The third projection 252 is of a size and length to form a steerer tube 140. Next, the method performs a swaging operation on a portion 254, 256 of the first projection 248 and the second projection 246 respectively, that is distal from the third projection 252 (FIG. 36). Swaging is a cold working process using dies to produce a taper on the portions 254, 256, such that the end diameter of the elongated projections 246, 248 is smaller than the diameter adjacent to the third projection 252. It should be appreciated that in embodiments where the elongated portions 246, 248 will form blades in a suspension fork, swaging operation may be eliminated. It is contemplated that 3D forging operations shown in FIGS. 32-35 may be combined so the part shown in FIG. 35 is produced in a single 3D forging operation from the billet shown in FIG. 31.

In some embodiments, additional operations may be performed on the first projection 248 and second projection 246 as is known in the art to obtain the desired blade shape. For example, the projections 246, 248 may be "butted" to form a variable wall. The projections 246, 248 may also be formed to have non-round, a non-uniform, or variable shape along their length for example.

Figure 37:
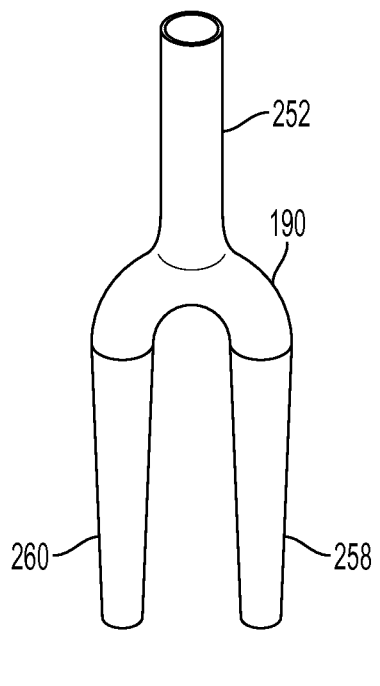
Figure 38:
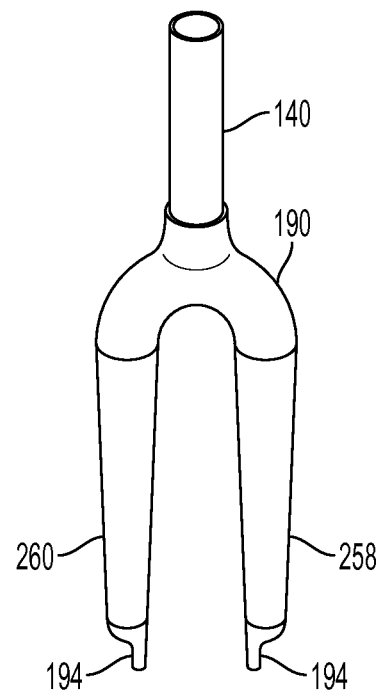

Once the elongated projections 246, 248 are swaged, a bending operation is used to form a crown 190 and blades/fork-legs 258, 260 (FIG. 37). Finally, secondary operations are performed, such as machining the third projection 252 to form the final dimensions of a steerer tube 140 or the welding, brazing, bonding or joining of drop outs 194 (FIG. 38). Other secondary operations may also include the forming of other features, such as bores 232, 234 for example.

Turning now to FIGS. 39-50, another exemplary method of forming a unitary steerer tube-crown-fork 402 using a multistage 3D forging is described. The unitary steerer tube-crown-fork 402 is similar to the steerer tube-crown-blade 236 except with a single rigid leg or blade. The unitary steerer tube-crown-fork 402 forms a rigid connection between the wheel 110 and the handlebar 145.

Figure 41:
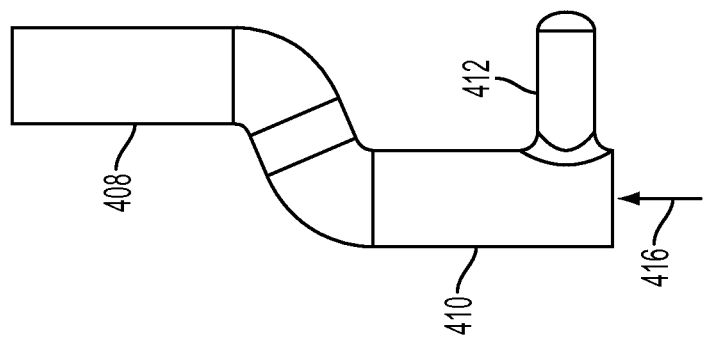
FIG. 39-44 are an illustration of a process for fabricating another unitary steerer tube-crown-fork having a single fork in accordance with an embodiment of the invention.
Figure 40:
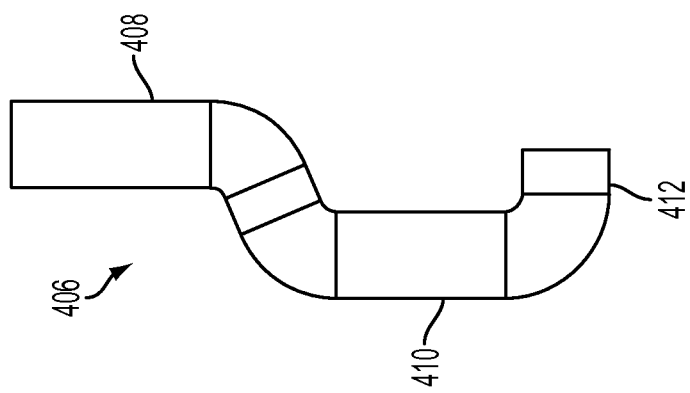
Figure 39:
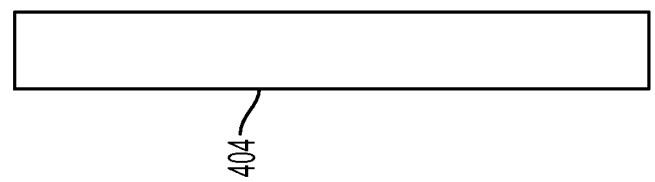

The method starts with a billet 404, formed from a metal such as aluminum including 6061-T6, 7075-T6, 7050-T73, 2024, 2014 or 6069 aluminum alloys for example, as illustrated in FIG. 39. The billet is then bent to form the basic shape 406 of the unitary steerer tube-crown-fork 402. The basic shape 406 includes a first portion 408 that will form the steerer tube, a first projection 410 that will form the leg or blade, and a second projection 412 that will be used to form a spindle. With the basic shape 406 formed, the next step involves a two-dimensional forging process that forms the shape 414 as shown in FIG. 41. The forging mandrill in inserted in the direction indicated by the arrow 416. This two-dimensional forging results in an elongated second projection 412 having a smaller diameter.

Figure 44:
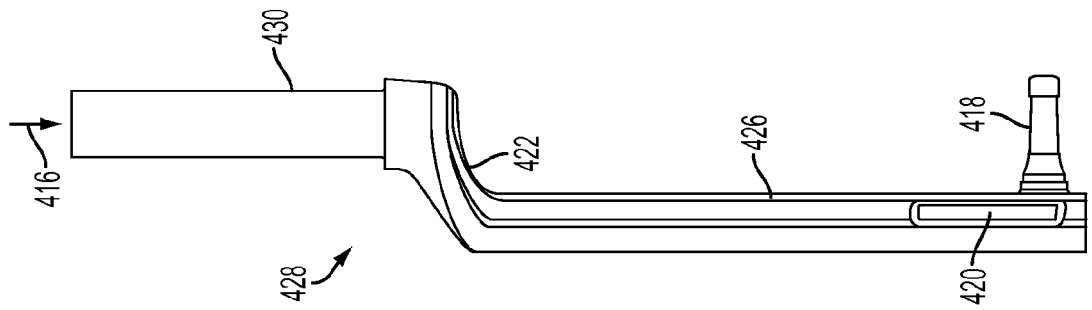
Figure 43:
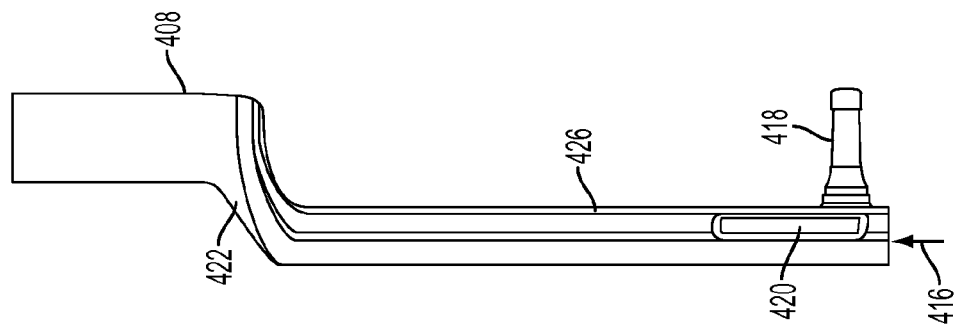
Figure 42:
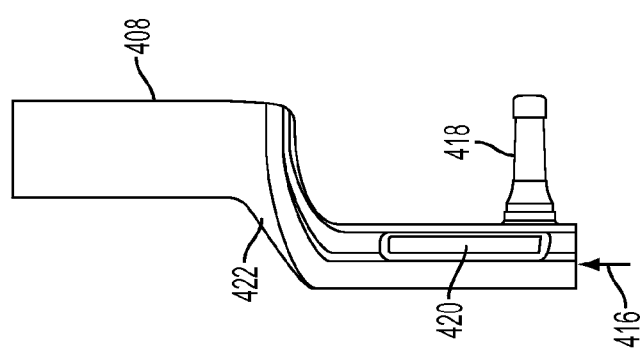
Figure 45:
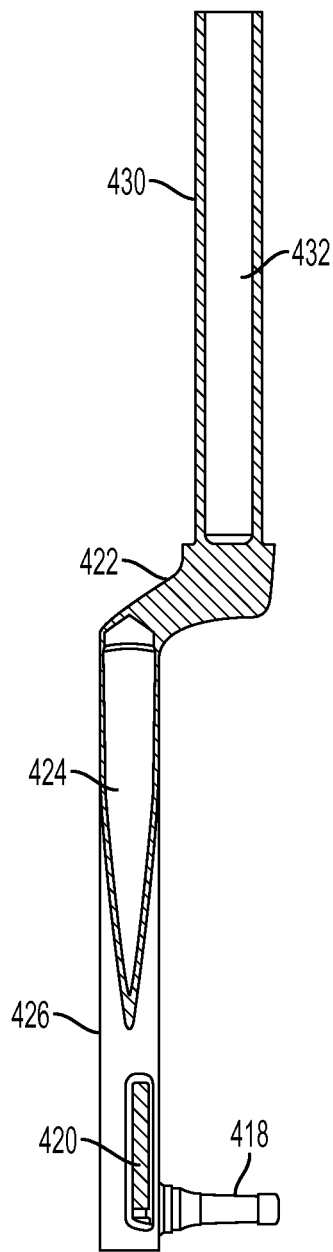
FIG. 45 is a side plan view, partially in section, of the fabricated steerer tube-crown-fork of FIG. 44.

With second projection 412 elongated, the billet 404 is subjected to a 3D forging process that forms to spindle 418, brake tabs 420 and crown 422 as shown in FIG. 42. The mandrill direction is indicated by the arrow 416. The 3D forging further forms the bore 424 (FIG. 45). Next, the method performs a second 3D forging process that shapes and extrudes fork blade 426 to desired length as shown in FIG. 43. The final shape 428 is formed in a third 3D forging process that forms the top portion 408 as shown in FIG. 44 into the steerer tube 430 and the bore 432 (FIG. 45). It is contemplated that 3D forging operations shown in FIGS. 41-44 may be combined so the final shape 428 is produced in a single 3D forging operation following the two-dimensional forging process.

Figure 46:
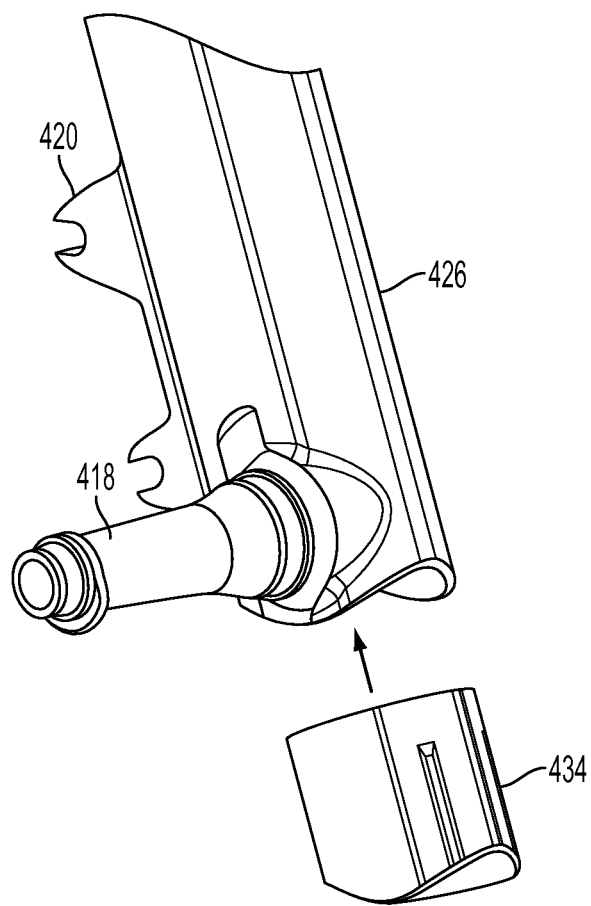
FIG. 46-48 are an illustration of assembling a blade insert in the steerer tube-crown-fork of FIG. 45.
Figure 47:
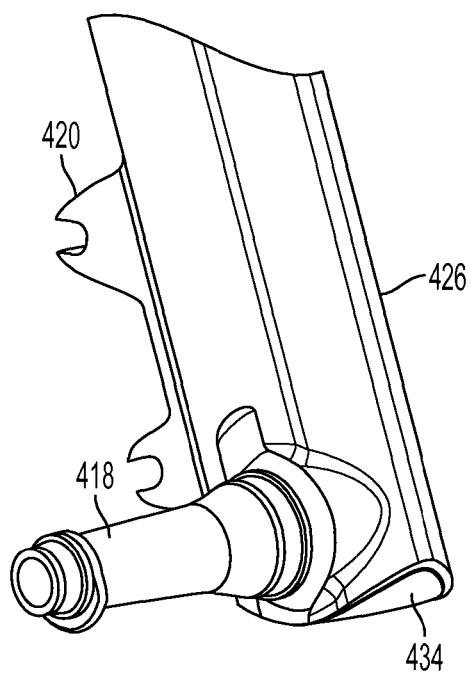
Figure 48:
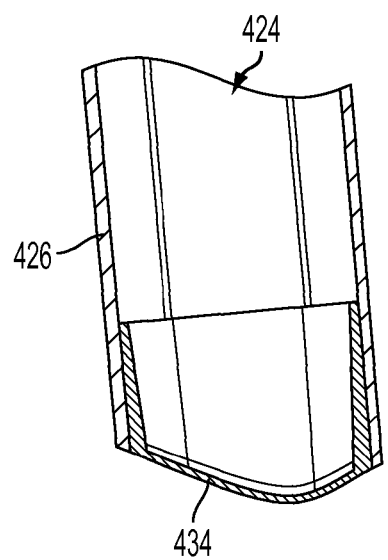

In some embodiments, it is desirable to close the end of bore 424 using a blade insert 434 as shown in FIGS. 46-48. In the exemplary embodiment, the blade insert 434 is arranged and bonded within bore 424. The blade insert 434 closes the end of the bore 424 and stabilizes the end of the spindle 418. Finally, secondary operations may be performed, such as machining the steerer tube 430 to final dimensions to form the final unitary steerer-tube-crown-fork 402 shown in FIGS. 49-50.

Figure 51:
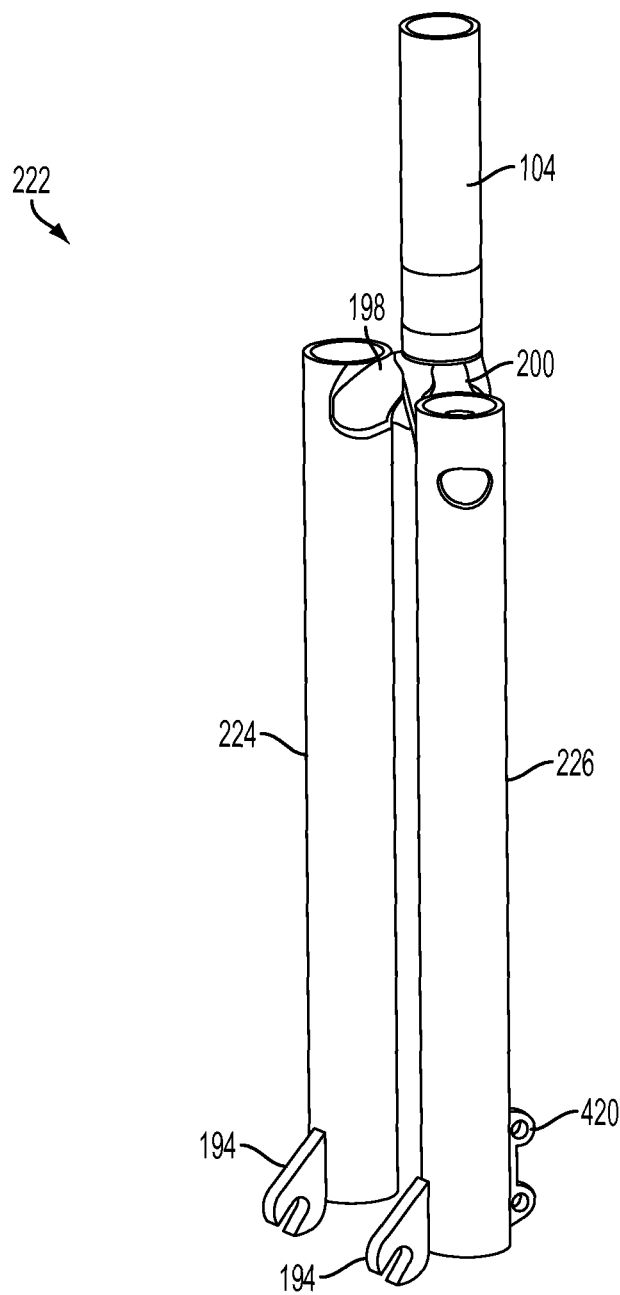
FIG. 51 is a perspective view illustration of an alternate finished steerer tube-crown-fork.

It should be appreciated that the 3D forging process discussed in reference to FIGS. 42-44 may also be used to fabricate a unitary steerer tube-crown-blade configuration shown in FIG. 51. This embodiment is substantially similar to the unitary steerer tube-crown-blade 222 illustrated in FIGS. 7-10. In this embodiment, a 3D forging step is included to form the wheel mounting interface or dropouts 194 and the brake mounts 420 on substantially opposite sides of the forks or blades 224, 226.

The 3D forging process described above may also be used with other components of bicycle 100 to gain the advantage of reducing the number of parts while reducing weight and maintaining a high strength and ductile material performance. Turning now to FIGS. 52-99 a low weight, reduced part count, high strength crank assembly 170 and a method of fabrication will be described.

Figure 52:
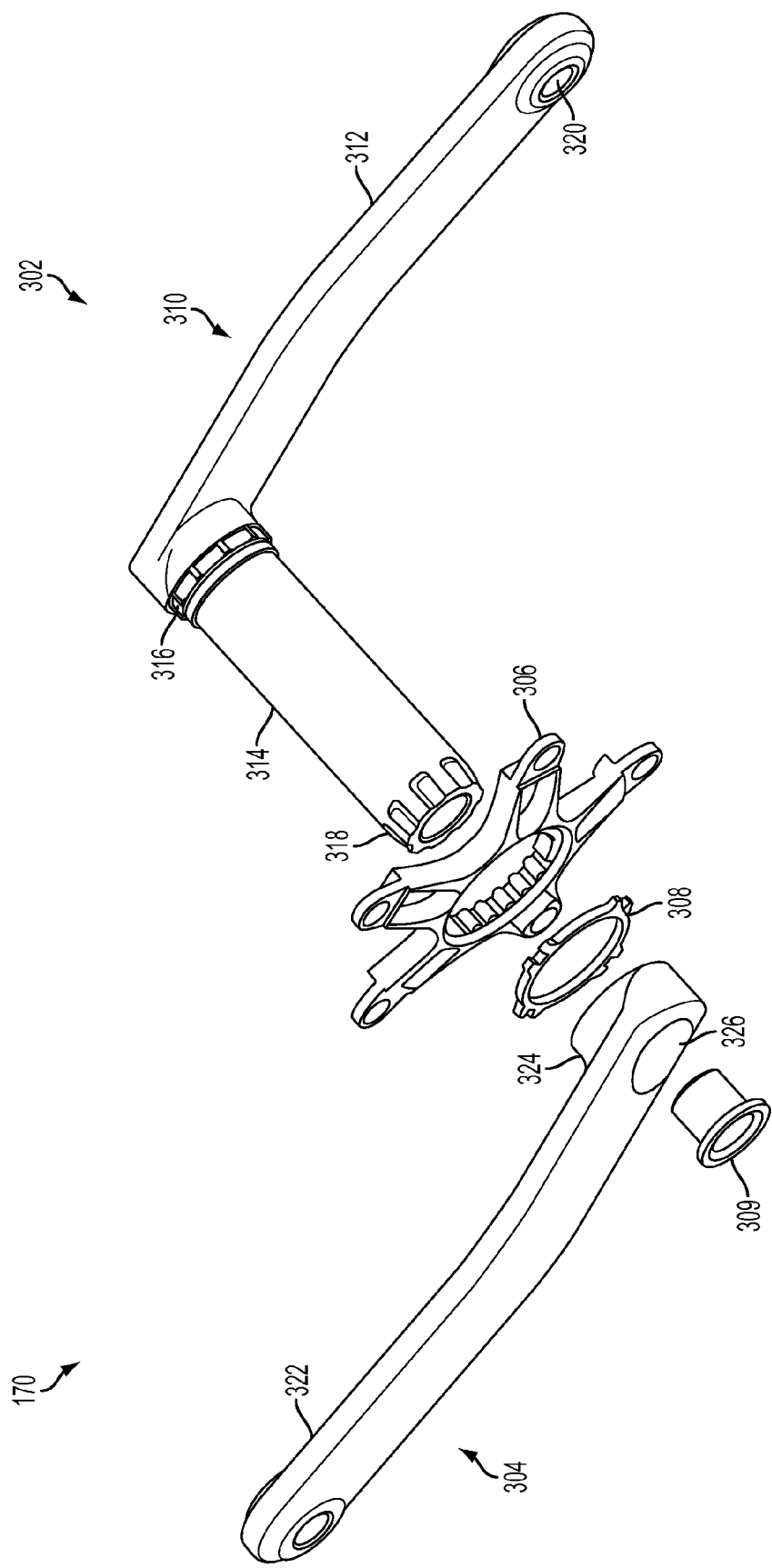
FIG. 52 is an exploded perspective view illustration of a crank assembly embodiment for the bicycle of FIG. 1.

The crank assembly 170 includes a first portion 302, a second portion 304, a spider 306, a lock ring 308, and a bolt 309 as shown in FIG. 52. The first portion 302 includes an unitary and monolithic arm-spindle member 310 that is formed from a metallic material, such as aluminum including but not limited to 6061-T6, 7075-T6, 7050-T73, 2024, 2014 or 6069 aluminum alloys for example. The first portion 302 is formed by a 3D forging process will be described in more detail below. The unitary member 310 includes an arm portion 312 with the spindle portion 314 extending from one end. The unitary member 310 also includes features such as a spider interface 316 and a second portion interface 318. First portion 302 may also include a pedal (not shown) that couples to the unitary member 310 by an opening 320 in the arm 312. In another embodiment, the spider 306 may be formed through a 3D forging operation as a unitary part of the unitary member 310. This would eliminate the machining of the spider interface 316 and the lock ring 308 as well. A modular separable spider 306 may, however, provide advantages by allowing the use of the crank assembly 170 on a variety of bicycle models (e.g. road bikes, mountain bikes etc.).

The second portion 304 includes an arm portion 322 that is similar in size and shape to the arm 312. A boss 324 extends from one end of the arm 322. The boss 324 includes an opening 326 with features that are sized and shaped to receive the second portion interface 318 and the spindle 314. A fastener 309 extends through the opening 326 and the spindle 314 to couple the first portion 302 to the second portion 304 when the crank assembly 170 is mounted to the bicycle 100.

Figure 53:
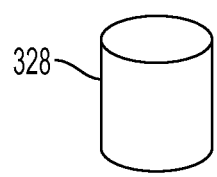
FIG. 53-60 are an illustration of a process for fabricating a unitary crank-arm and spindle member for the crank assembly of FIG. 52.
Figure 54:
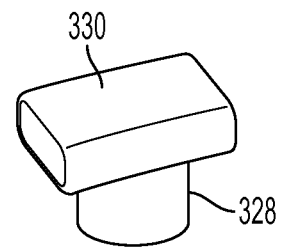
Figure 55:
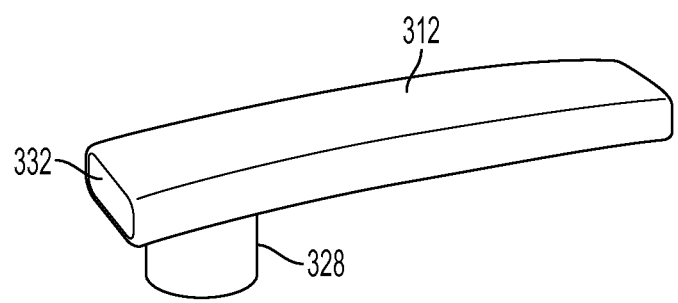
Figure 56:
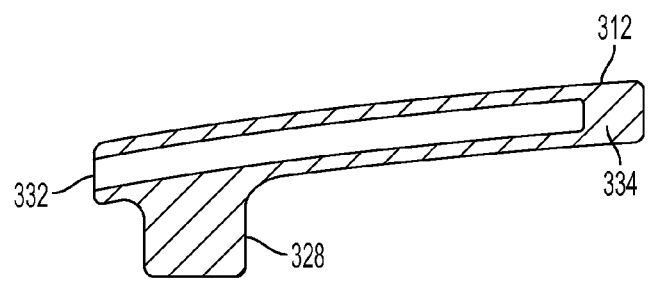
Figure 61:
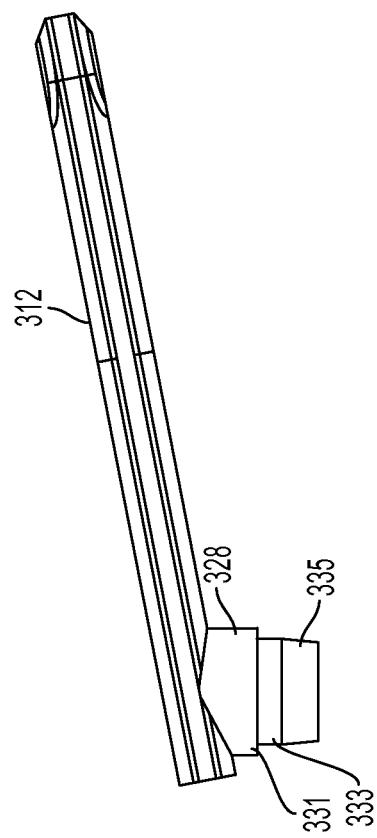
Figure 63:
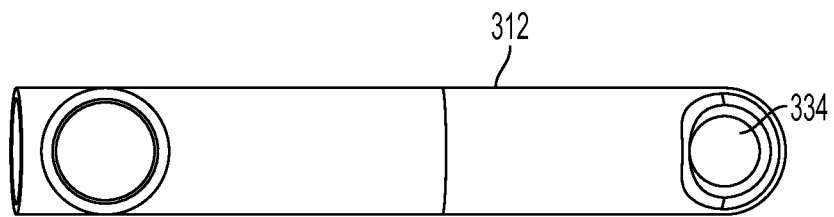

A process for forming the first portion 302 is shown in FIGS. 52-59. The process begins with a billet 328 made from a metallic material, such as aluminum including but not limited to 6061-T6, 7075-T6, 7050-T73, 2024, 2014 or 6069 aluminum alloys for example (FIG. 53). The billet undergoes a first forging process in FIG. 54 to form a generally rectangular portion 330. The first forging process may also form a step 331 in the billet 328 forming a smaller diameter portion 333 as shown in FIG. 61. The smaller diameter portion 333 may further include a small tapered section 335. In some embodiments, the step 331 provides a surface against which the spider 306 is positioned. The tapered section may also form the second portion interface 318 during secondary operations.

Figure 65:
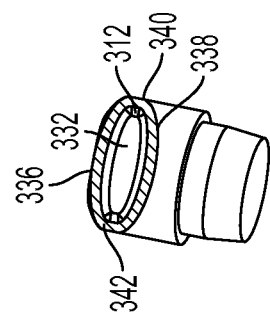
Figure 64:
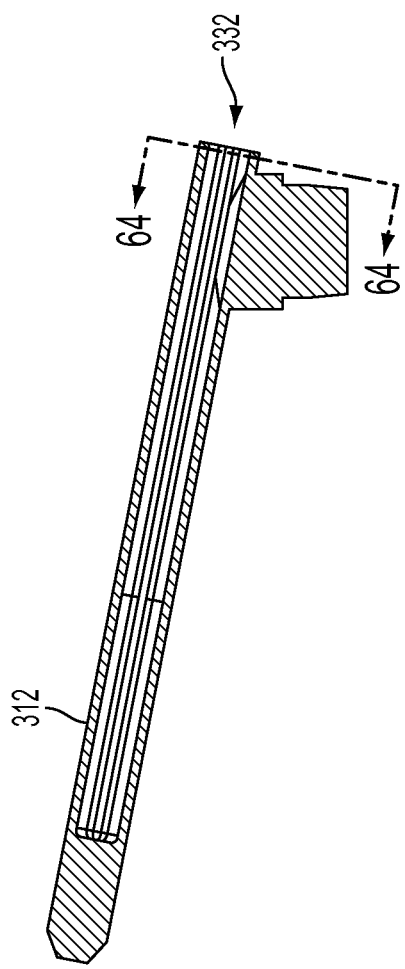
Figure 66:
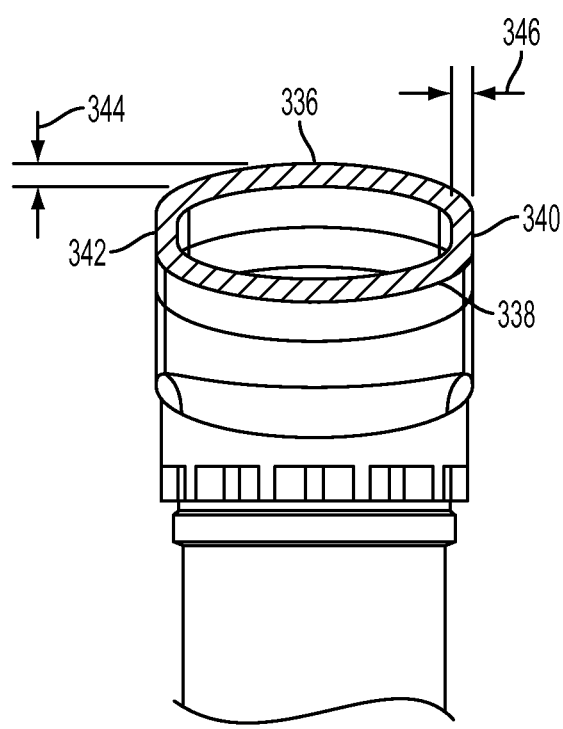
Figure 68:
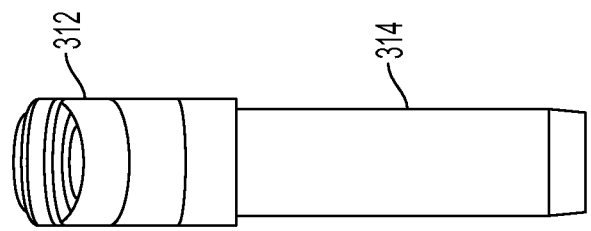
FIG. 67-71 are an illustration of the unitary crank-arm and spindle member of FIG. 57 and FIG. 58.
Figure 67:
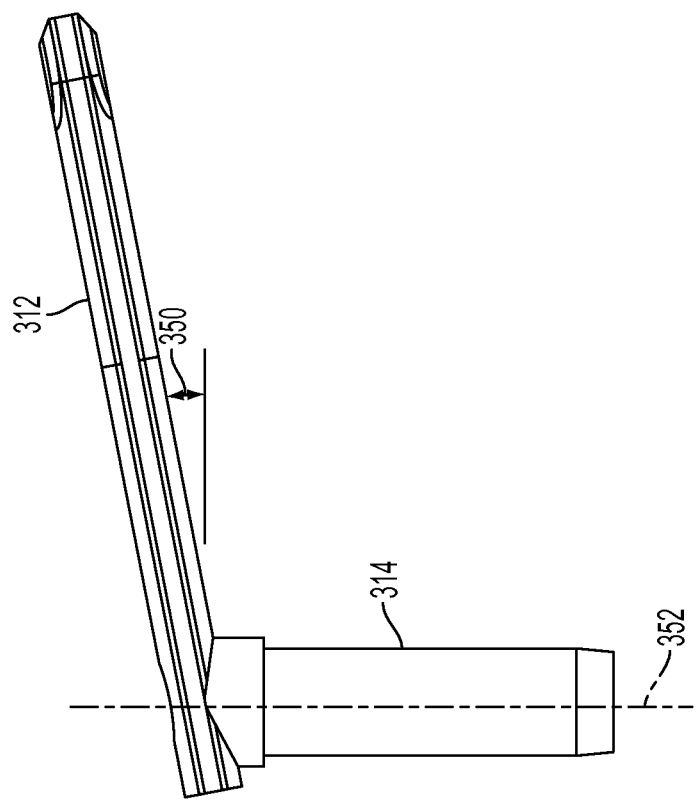
Figure 69:
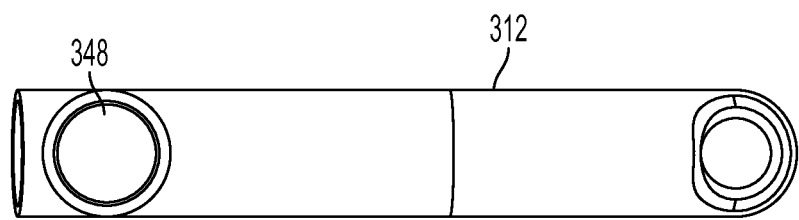
Figure 71:
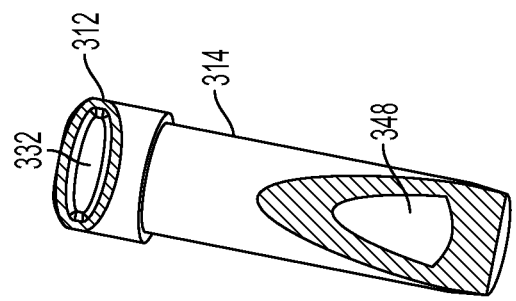
Figure 70:
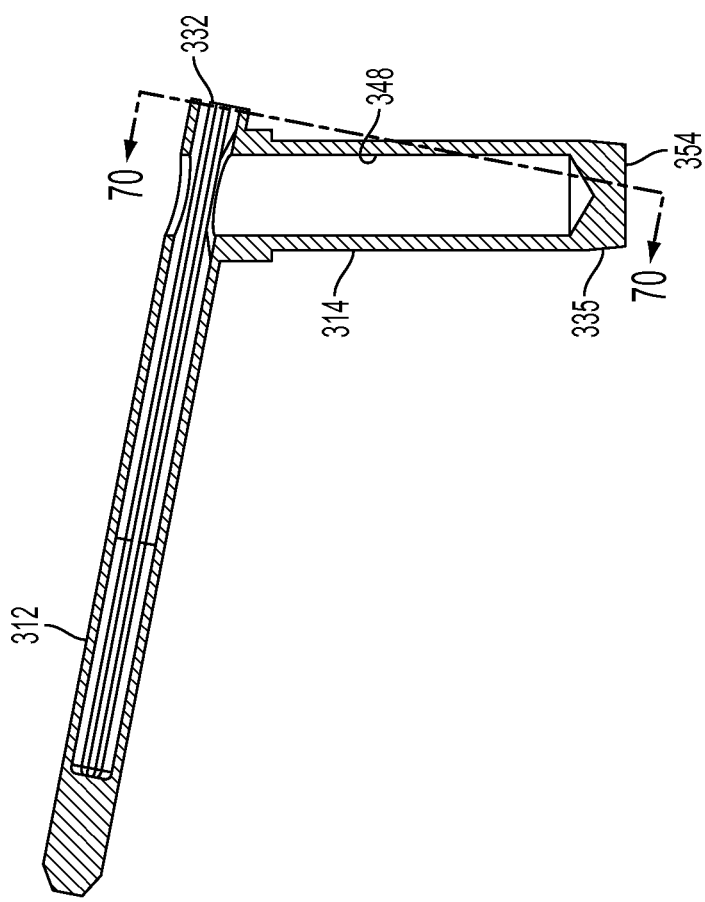
Figure 73:
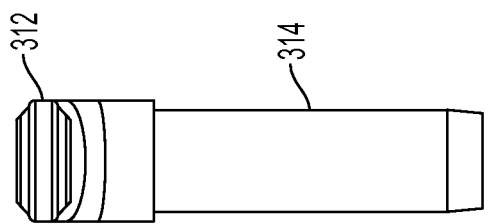
FIG. 72-76 are an illustration of the unitary crank-arm and spindle member of FIG. 51.
Figure 72:
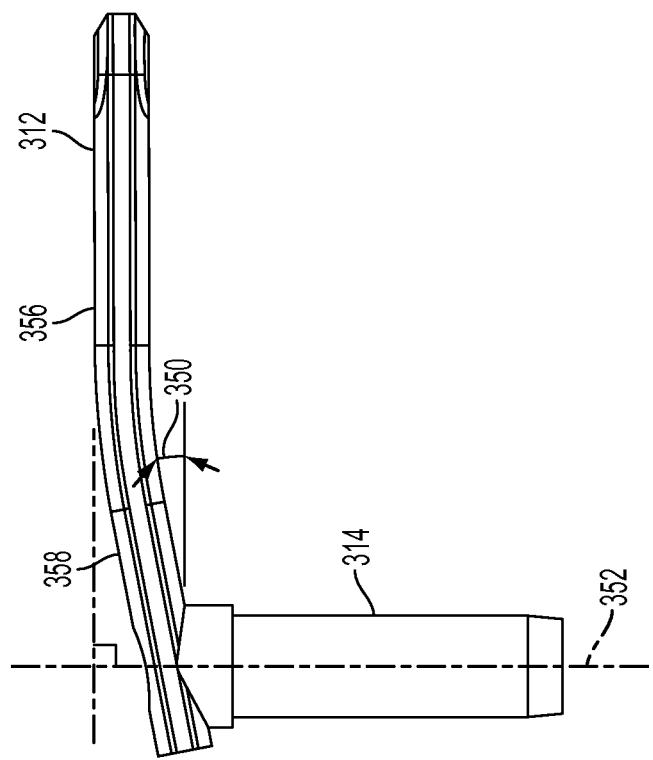
Figure 74:
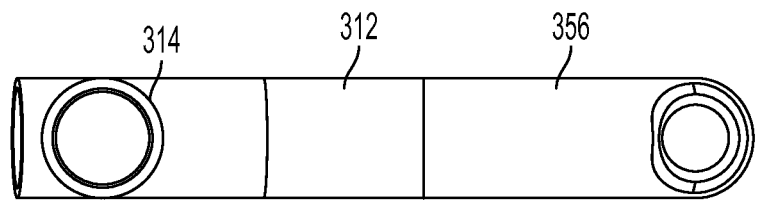
Figure 76:
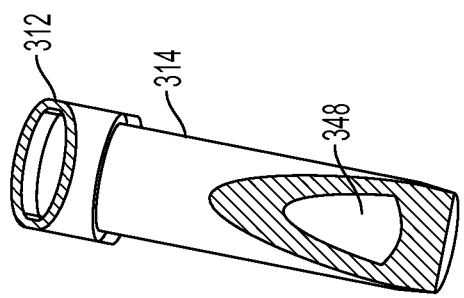
Figure 75:
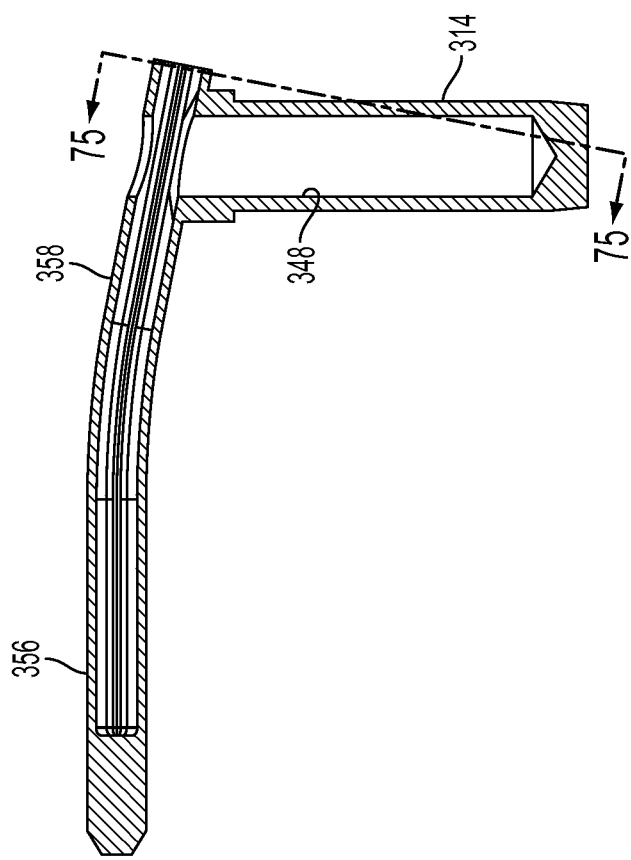
Figure 78:
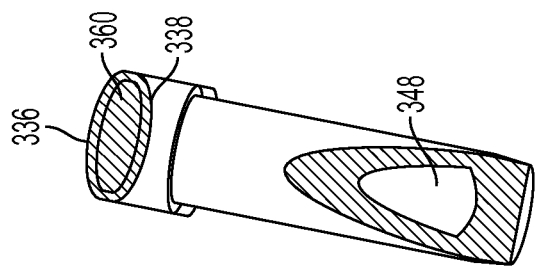
FIG. 77-80 are an illustration of the unitary crank-arm and spindle member of FIG. 60 with a plug being inserted.
Figure 77:
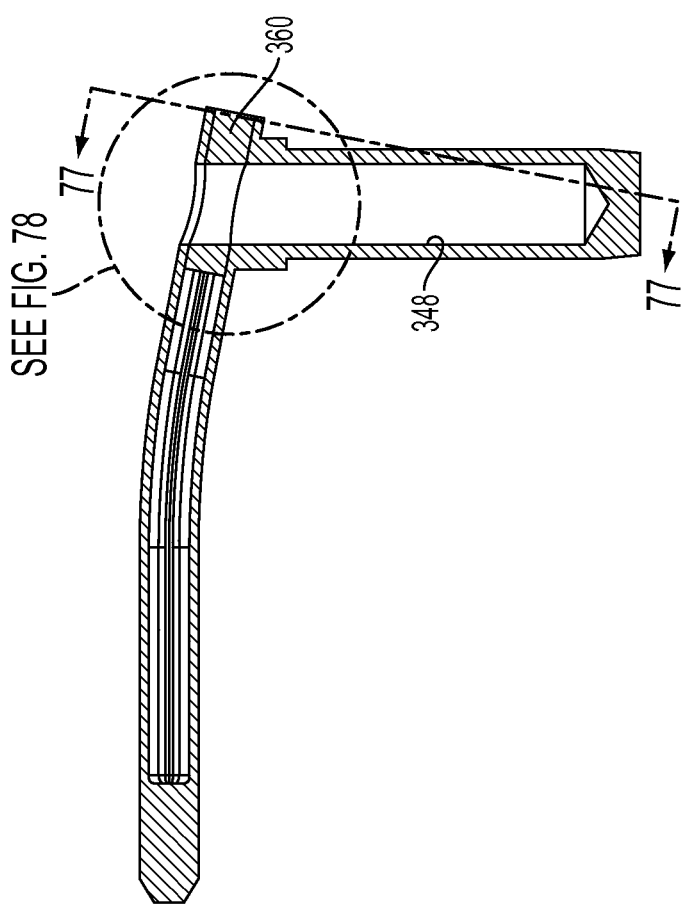
Figure 79:
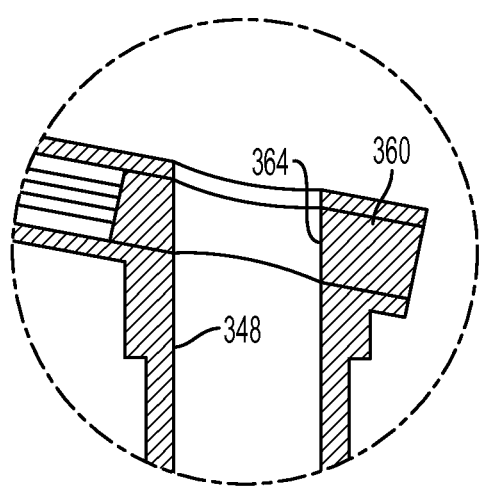
Figure 80:
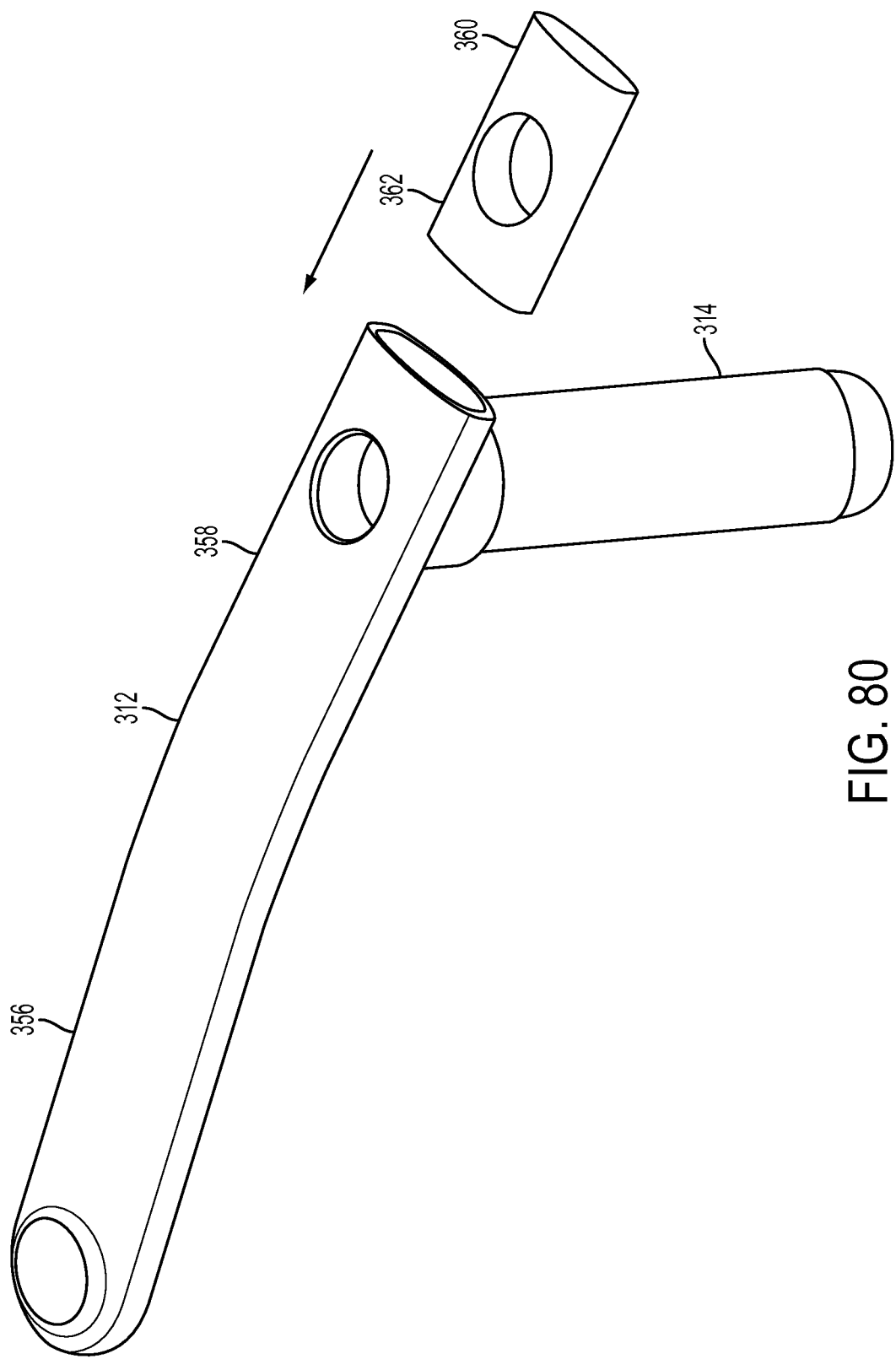
Figure 81:
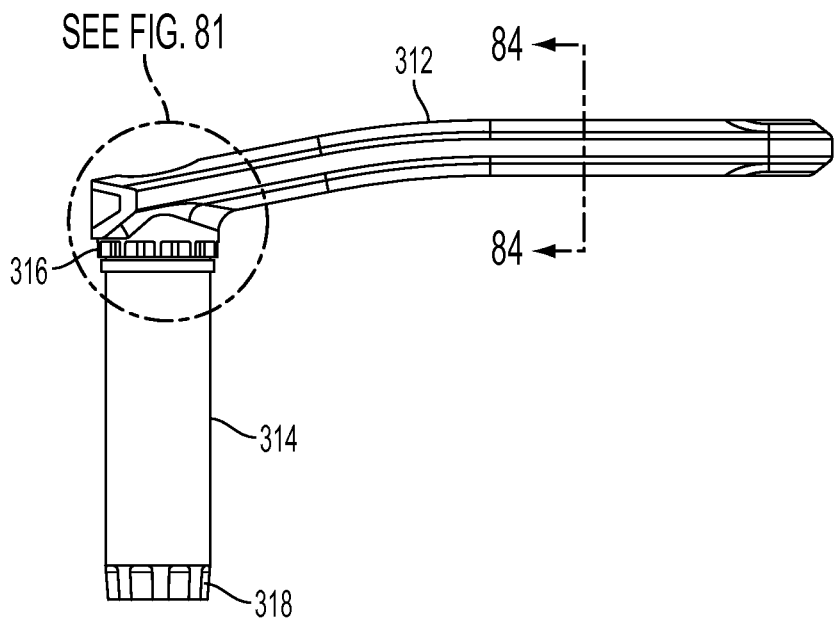
Figure 82:
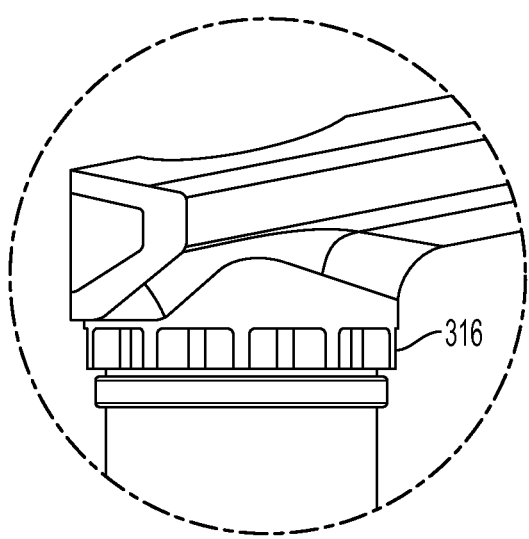
Figure 86:
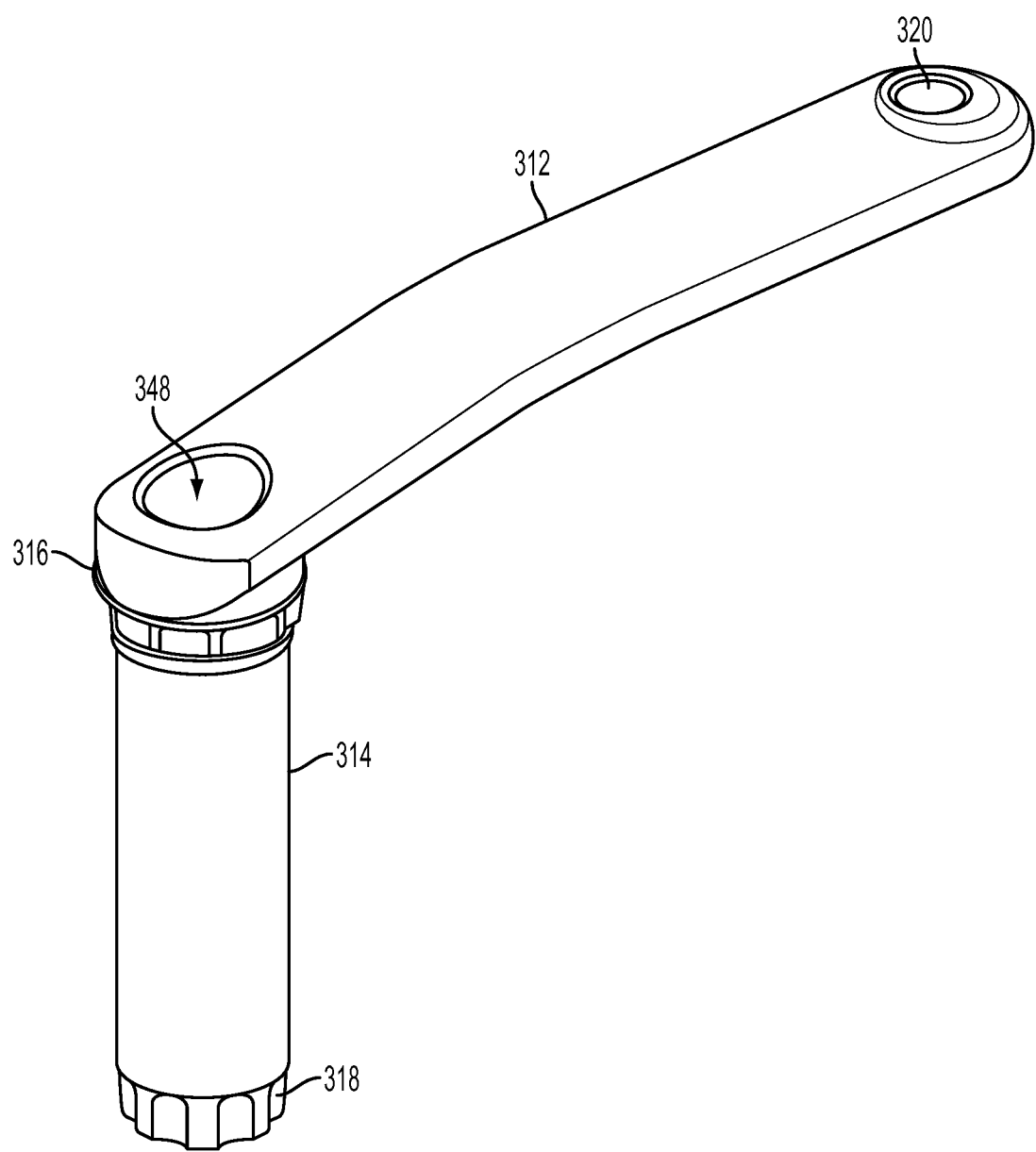
Figure 87:
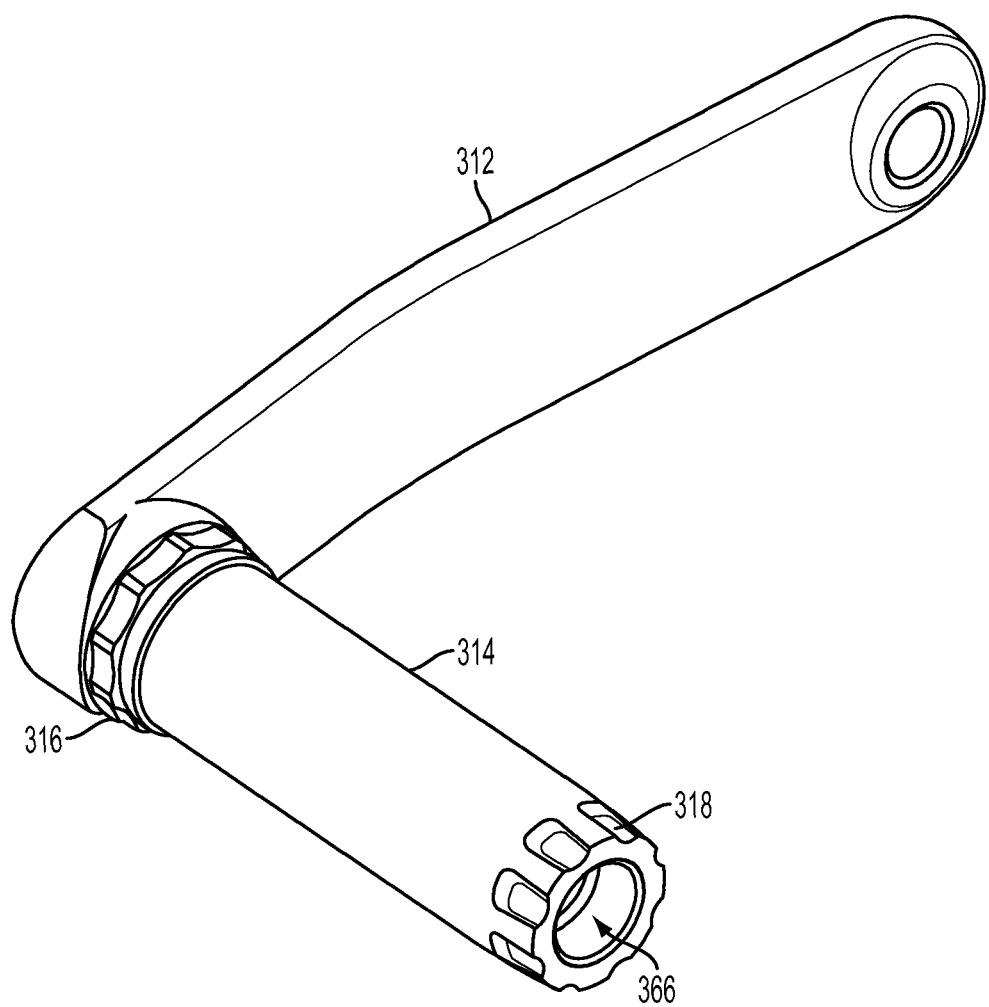

The billet 328 is then processed with a first 3D forging operation to form the arm 312 with an axial bore 332 and a solid portion 334 on one end as shown in FIGS. 55-56 and FIGS. 61-65. The arm 312 is formed on an angle 350 (FIG. 67) relative to the axis 352 of the spindle 314. In one embodiment, the arm 312 has a curved first wall 336 and curved second wall 338. The curved walls 336, 338 are connected by a third wall 340 and a fourth wall 342 as shown in FIG. 65. The walls 336, 338, 340, 342 define the axial bore 332. In one embodiment, illustrated in FIG. 66, the curved walls 336, 338 have a first thickness 344 and the connecting walls 340, 342 have a second thickness 346. In the exemplary embodiment, the first thickness 344 is one-half the width of the second thickness 342. In one embodiment, the first thickness 344 is 2 millimeters and the second thickness 342 is 4 millimeters.

Figure 57:
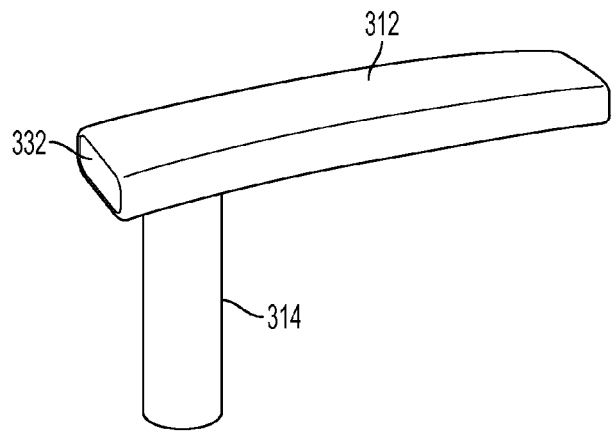
Figure 58:
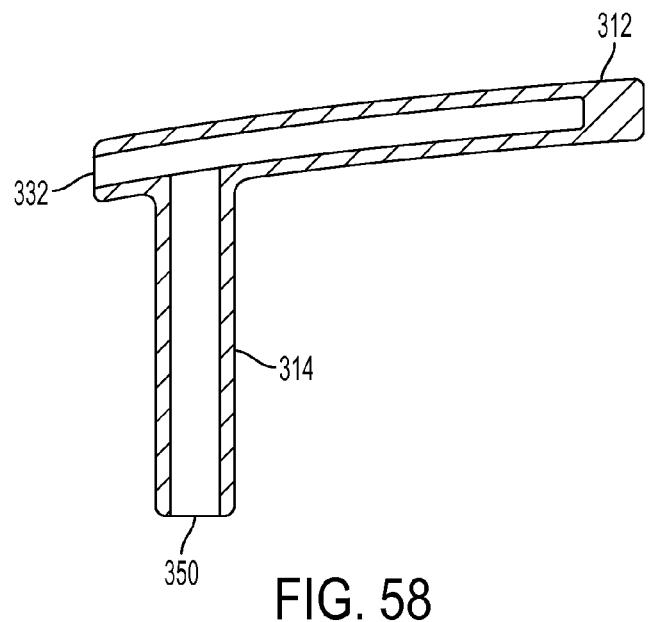
Figure 59:
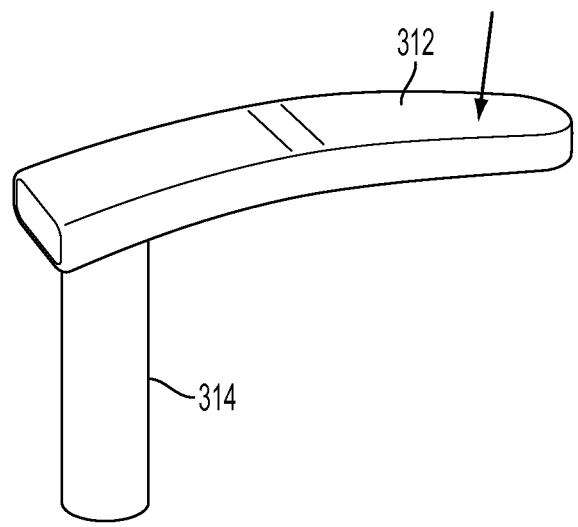
Figure 60:
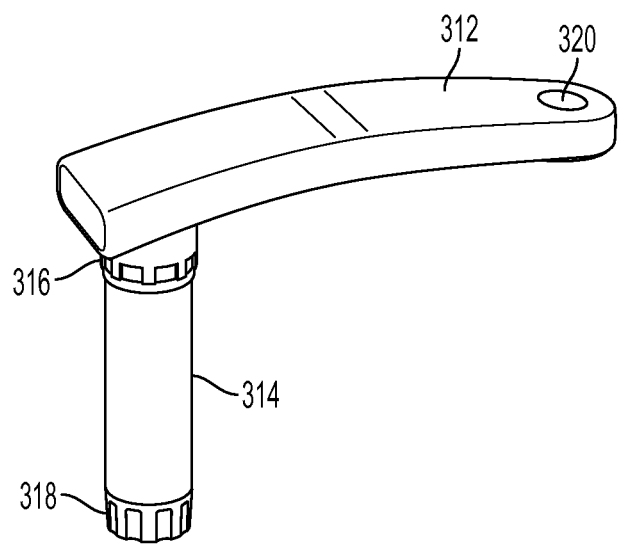
Figure 62:
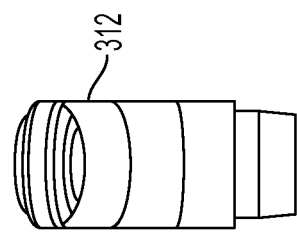
FIG. 61-66 are an illustration of the unitary crank-arm and spindle member of FIG. 55 and FIG. 56.

With the arm 312 formed, the process then extends the smaller diameter portion 331 with a second 3D forging to form a spindle 314 as shown in FIGS. 57-58 and FIGS. 67-71. The spindle 314 is formed with an axial bore 348. The axial bore 348 intersects the axial bore 332 of the arm 312. In one embodiment, the axial bore 348 is formed during the second 3D forging step as a blind hole to extend through the arm 312 as shown in FIGS. 67-71. In another embodiment, the bore 348 is formed as a blind hole with an opening on the end 354 of the spindle 314, as shown in FIGS. 57-58. In either embodiment, the bore 348 is subsequently extended to be a through-hole during secondary operations. In the exemplary embodiment, the spindle 314 has a 30 millimeter outer diameter After forming the spindle 314, the process then performs a bending operation on the arm 312 as shown in FIG. 59 and FIGS. 72-76. In one embodiment, the bending operation changes the angle of a portion 356 of arm 312 from being oriented on an angle 350 to being substantially perpendicular to the axis 352. A second portion 358 remains oriented on the angle 350.

The next step in the process is to close the end of the axial bore 332. It should be appreciated that the arm 312 and spindle 314 transfer the bicycle rider's energy during each stroke resulting in a large load being applied to the area of the first portion 302 where the arm 312 and spindle 314 intersect. To strengthen and stiffen this intersection, a pin or plug 360 is inserted into the axial bore 332 (FIGS. 77-87). The plug 360 is shaped to conform to the shape of the axial bore 332, such as an arcuate surface 362 to match the curved walls 336, 338 for example. Plug 360 may also includes a hole 364 sized to substantially the same size and shape as the axial bore 348. When inserted in the axial bore 232, plug 360 is arranged such that the hole 62 is coaxial with the axial bore 348. The plug 360 is coupled to the first portion 302 such as by a press fit, bonding or brazing for example.

Figure 88:
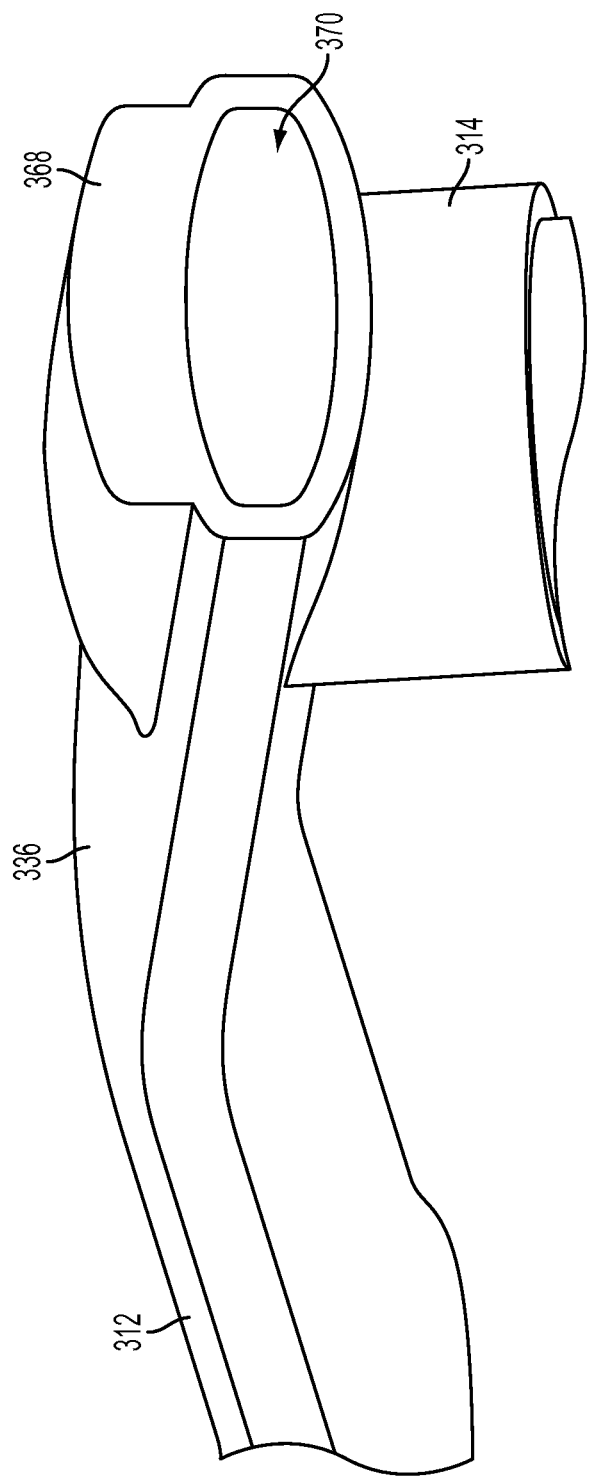
FIG. 88-89 are an illustration of the unitary crank-arm and spindle member of FIG. 52 with another embodiment for closing the end of a bore.
Figure 89:
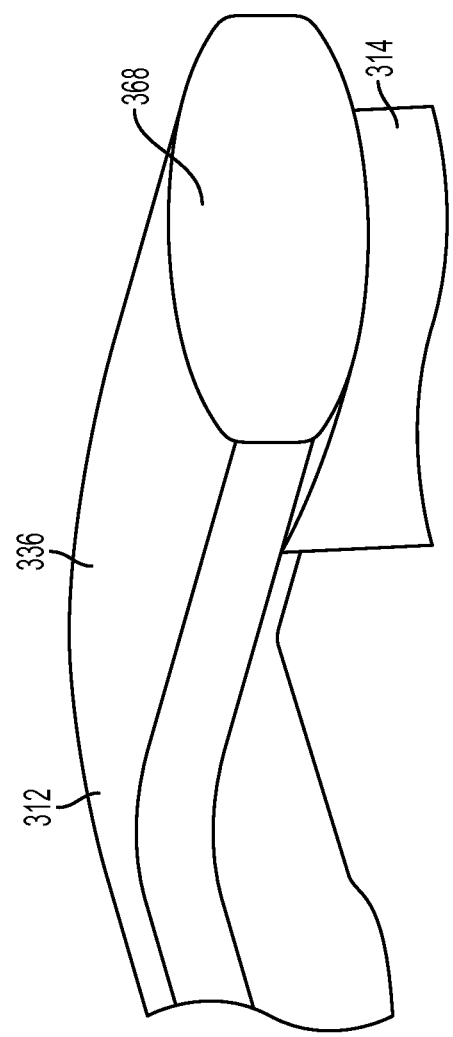

In another embodiment, the end of the axial bore 332 is closed in a forging process instead of with plug 360, as is shown in FIGS. 88-89. In this embodiment, a projection 368 is formed on the wall 336 opposite the spindle 314. The projection 368 may be formed during one of the 3D forging processes, such as that shown in FIG. 57-58 for example. To close the end of the axial bore 332, the projection 368 is processed in a forging that displaces the material of the projection 368 into the opening 370 in the axial bore 332. This closes the opening 370 and results in a substantially smooth outer surface on wall 336 as shown in FIG. 89.

With the plug 360 secured, or the axial bore 332 otherwise closed, the process finishes the unitary member 310 with secondary machining operations to the spindle 314 to form the spider interface 316, the second portion interface 318 and the extension 366 of the axial bore 348 into a through-hole as shown in FIG. 60 and FIGS. 81-87. The opening 320 is formed in the solid portion 334 for mounting the pedals.

Figure 90:
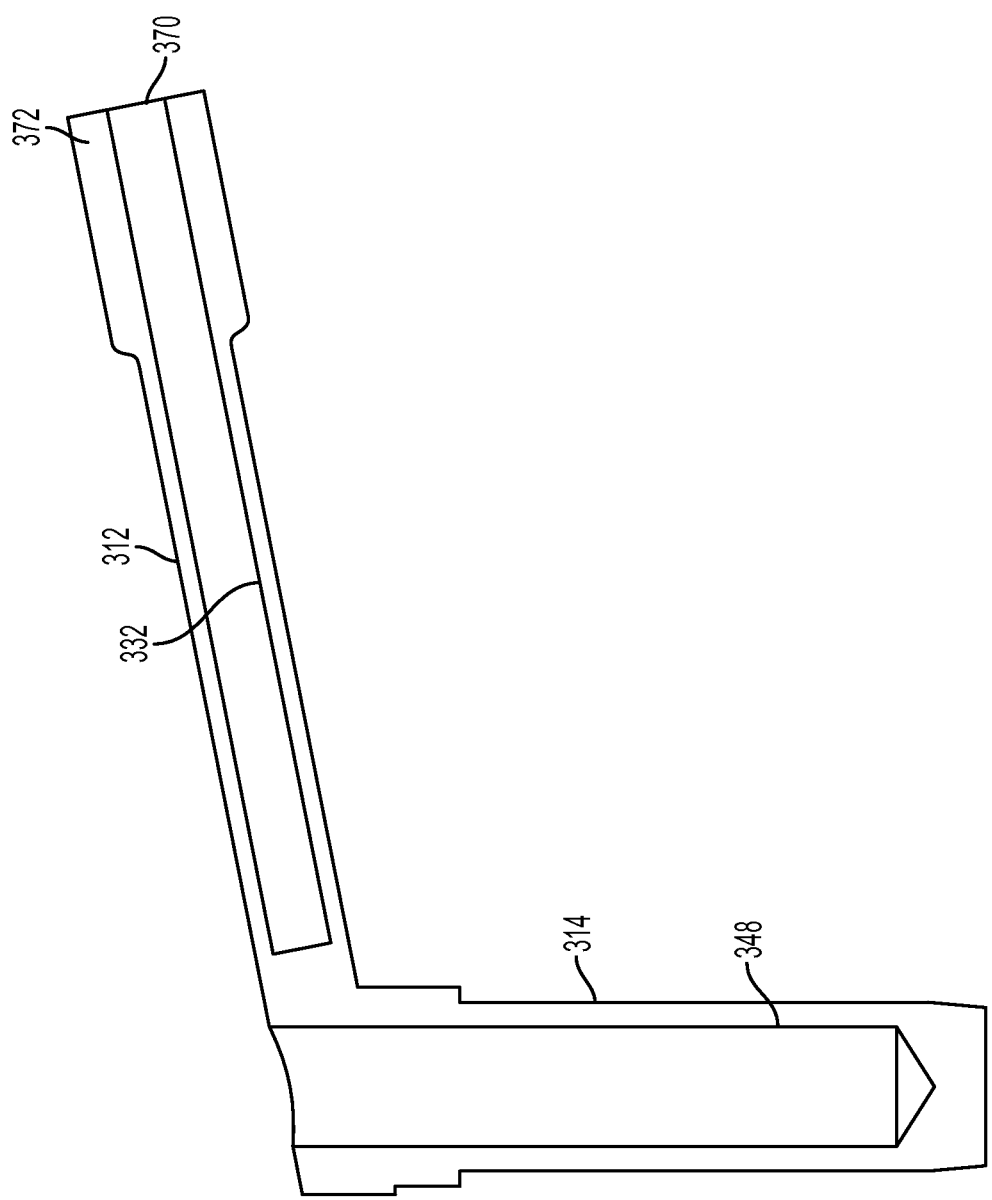
FIG. 90-91 are an illustration of another unitary crank-arm and spindle member for the crank assembly of FIG. 52; and, FIG. 92-99 are an illustration of a second portion crank arm for the crank arm assembly of FIG. 52.
Figure 91:
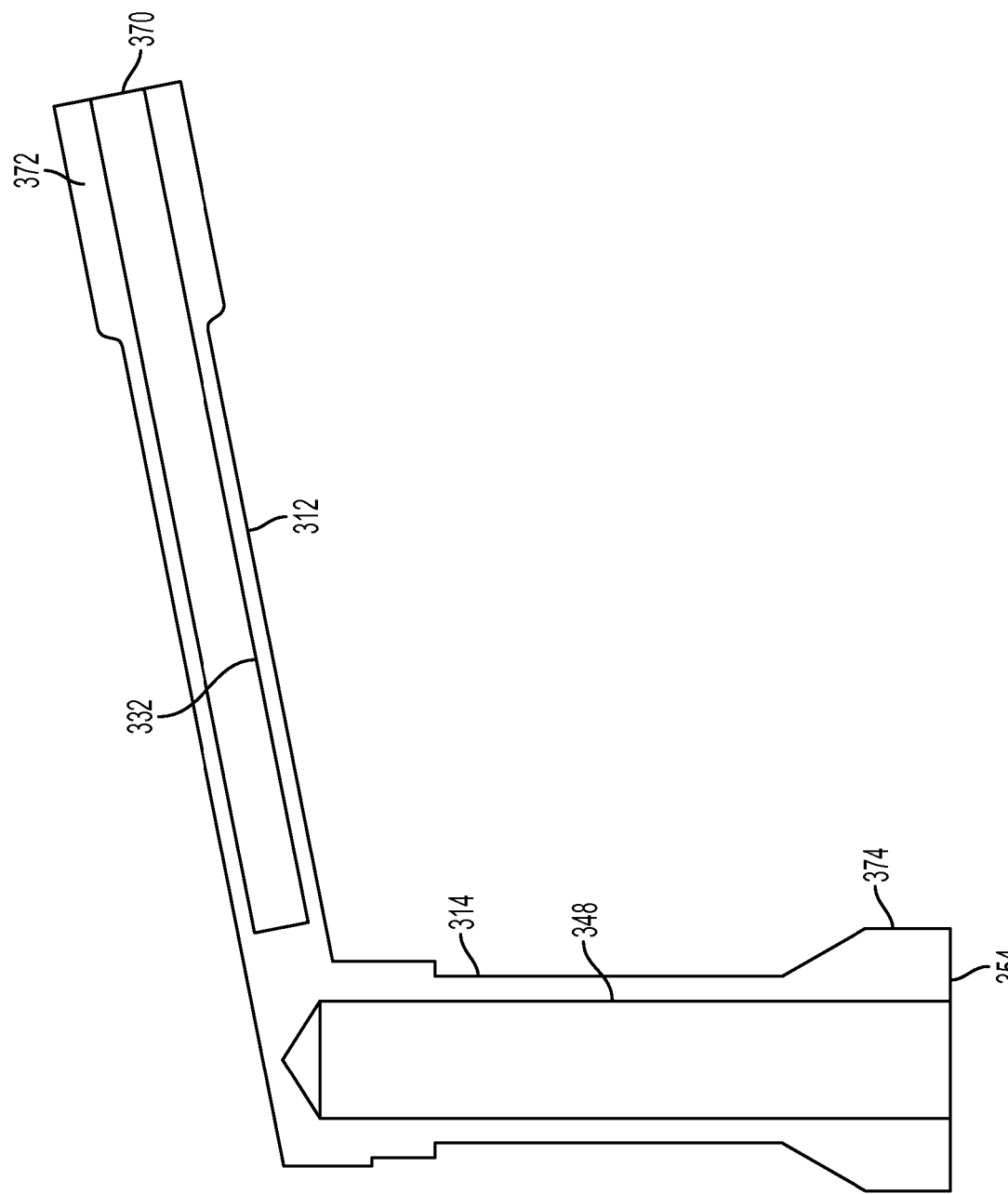
Figure 92:
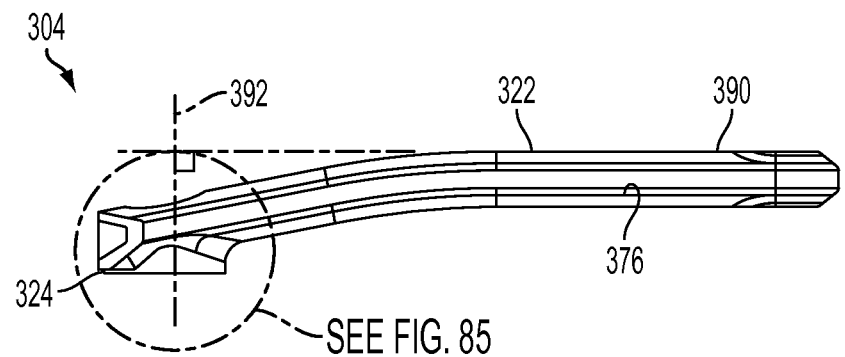
Figure 93:
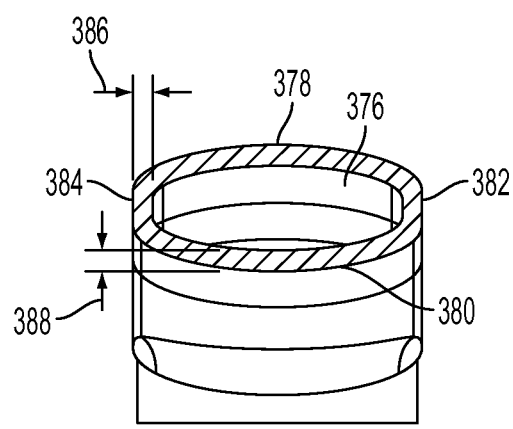
Figure 94:
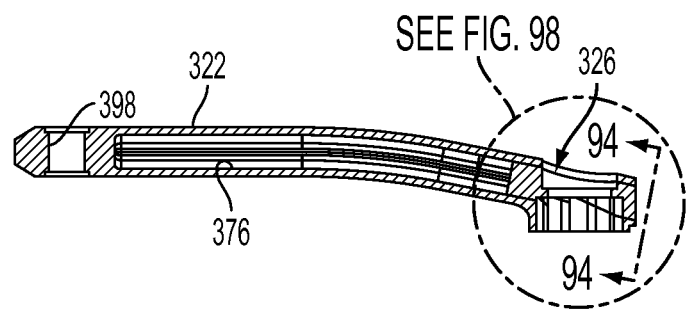
Figure 95:
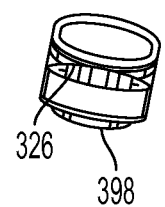
Figure 96:
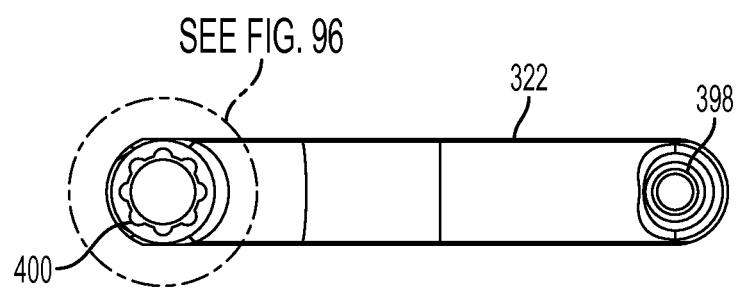
Figure 97:
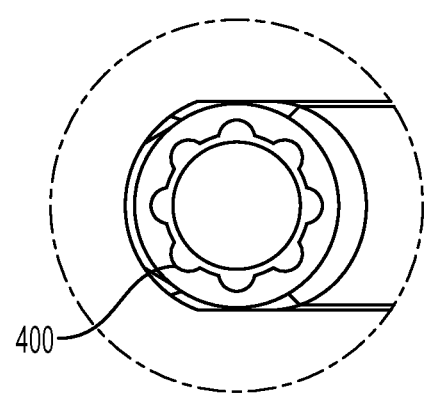
Figure 98:
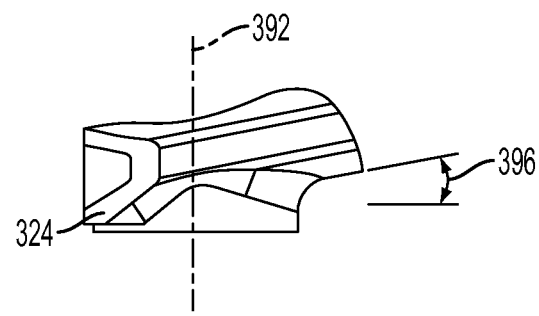
Figure 99:
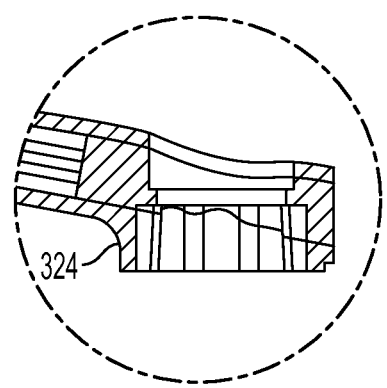

In another embodiment, a similar process to that described above may be used to perform the 3D forgings from the pedal end of the arm as shown in FIGS. 90-91 In the embodiment shown in FIG. 90, the arm 312 is formed in a 3D forging with the opening 370 positioned on the opposite end of the arm 312 from the spindle 314. A projection 372 is formed on the arm 312 adjacent the opening 370 to allow a forging step to close the opening 370 and form the solid portion 334. Once the solid portion 334 is formed, the spindle 314 is formed by a 3D forging as described above.

In the embodiment shown in FIG. 91, the arm 312 is formed in a 3D forging with the opening 370 positioned on the opposite end of the arm 312 from the spindle 314. A projection 372 is formed on the arm 312 adjacent the opening 370 the spindle 314 is formed by a 3D forging with a projection 374 on an end of the spindle 314 opposite the arm 312. The projection 374 is then displaced in a forging operation to close the end 354 of the axial bore 348. Finally, a forging step displaces material to close the opening 370 and form the solid portion 334.

The second portion 304 shown in FIGS. 92-99 may also be formed from a series of 3D forging processes substantially similar to that described with regards to the first portion 302. A billet is forged to form a rectangular portion similar to rectangular portion 334. The arm 322 having an axial bore 376 is then formed with a 3D forging with the axial bore 376 being formed from a pair of opposing curved walls 378, 380. A pair of connecting walls 382, 384 connects the curved walls 378, 380. In one embodiment curved walls 378, 380 have a thickness 386 that is one-half the thickness 388 of the connecting walls 382, 384. In one embodiment, the thickness 386 is 2 millimeters and thickness 388 is 4 millimeters.

As with the spindle 314 of first portion 302, the boss 324 is then extended in a 3D forging operation. The opening 326 is formed partially in the 3D forging step, with the opening 326 being extended into a through-hole with a secondary operation. With the boss 324 formed, the arm 322 is bent with a first portion 390 being substantially perpendicular to an axis 392 of opening 326. A second portion 394 remains on an angle 396 (FIG. 98) relative to the axis 392. Once the arm 322 is bent, secondary machining operations are performed to form the opening 398 for the pedal (not shown) and the features 400 in opening 326 that couple to the second portion interface 318.

An embodiment of the invention, as shown and described by the various figures and accompanying text, provides a bicycle having one or more of the following features: a unitary and monolithic steerer tube and crown; a unitary and monolithic steerer tube, crown and front blades; a unitary monolithic crank arm and spindle; a hollow crank arm formed by 3D forging; and a monolithic and unitary fork assembly having a steerer tube, crown and blades formed by 3D forging. These features may have one or more of the following advantages over the prior art: lower in weight, higher strength, greater ductility, lower manufacturing cost, faster assembly and lower number of parts and components.

In accordance with one embodiment of the invention, a bicycle a bicycle is provided having a wheel, a head tube, and, a unitary fork operably coupled to said wheel. The fork includes a steerer tube operably coupled to the head tube, where the steerer tube includes a first bore having a first axis. A crown extends contiguously from one end of the steerer tube, wherein the fork is made from a three-dimensional (3D) forged metal material. In one embodiment, the crown comprises a first projection having a first opening, the first opening having a second axis, wherein the second axis is substantially parallel with the first axis. The crown may further comprise a second projection with a second opening, the second opening having a third axis, wherein the third axis is substantially parallel with the first axis. In another embodiment, the crown further comprises a second bore extending between the first opening and the first bore. In yet another embodiment, the crown further comprises a third bore extending from the first opening through an end of the first projection, wherein the third bore is coaxial with the first bore. In yet another embodiment, the first bore is closed on an end adjacent the crown. In yet another embodiment, the first opening is closed on an end adjacent the crown. In yet another embodiment, the fork further comprises a first projection extending contiguously from crown, and a first blade extends contiguously from the first projection in a direction substantially opposite the steerer tube. In yet another embodiment, the fork further comprises a second projection extending contiguously from the crown, and a second blade extends contiguously from the second projection, wherein the second blade is substantially parallel to the first blade. In yet another embodiment, the bicycle further includes a first dropout coupled to an end of the first blade opposite the crown and a second dropout is coupled to an end of the second blade opposite the crown.

In accordance with another embodiment, a method of fabricating a unitary bicycle fork is provided. The method includes performing a first forging on a billet to form a first projection. A first 3D forging is performed on the billet extending the first projection to form a crown. A second 3D forging is performed on the billet to form a steering tube, wherein the second projection is substantially perpendicular to the first projection. A first end of the first projection is swaged to form a blade. The first projection is bent in a direction opposite the second projection. A first drop out is joined on the first projection. A third projection is formed when performing the first forging on the billet. A third 3D forging is performed on the billet extending the third projection after the step of extending the first projection. The first projection is bent a direction opposite the second projection. The third projection is bent in a direction opposite the second projection after bending the first projection. A first drop out is joined to the first projection and a second drop out is joined to second projection. A first end of the first projection is swaged to form a blade and a second end of the third projection is also swaged. An opening is formed in the first projection, wherein the opening is substantially parallel to the second projection. A first bore is formed between the first opening and a second bore in the second projection. A third bore is formed between the first opening and an end of the first projection, wherein the third bore is substantially coaxial with the first bore. In one embodiment, the first projection includes a first axial bore having a closed end adjacent the second projection and the second projection includes a second axial bore having a closed end adjacent the first projection.

In accordance with another embodiment, a unitary bicycle fork is provided having a crown formed by a first 3D forging of a metal billet to form a first projection. A steerer tube is extended from the crown, the steerer tube formed by a second 3D forging, the steerer tube having a first axial bore therein. The crown further includes a first opening, the first opening being substantially parallel to the first axial bore. A second bore is arranged between the first bore and the first opening. A third bore is arranged between the first opening and an end of the crown, wherein the third bore is substantially coaxial with said second bore. A first blade extends from the crown, the first blade being formed from a first portion of the first projection wherein the first portion is swaged and then bent to extend in a direction opposite from the steerer tube and the first opening extends axially within the first blade. The first opening may also includes a closed end adjacent the steerer tube. The first bore may also include a closed end adjacent the crown. A second blade is extended from the crown, wherein the crown is formed by the first projection and a second projection during the first 3D forging, the second blade being formed from a second portion of the second projection, wherein the second portion is swaged and then bent to extend in a direction opposite the steerer tube. A first dropout is coupled to an end of the first blade opposite the crown, and a second dropout is coupled to an end of the second blade opposite the crown.

In accordance with another embodiment, a crank assembly for a bicycle is provided having a unitary first portion. The first portion includes a first arm having a first solid end and an first axial bore extending from the first end to a second end. The first portion also includes a spindle extending substantially perpendicular from the arm adjacent the second end, the spindle having a second axial bore extending into the first arm adjacent the second end, the second axial bore being arranged to intersection with the first axial bore. A second portion is provided having a second arm having a third solid end and an third axial bore extending from the third end to a fourth end, the second portion being operably coupled to the spindle adjacent the fourth end. The first arm may include a curved first wall and a curved second wall opposite the first wall, wherein the spindle extends from the second wall. A third wall is arranged between the first wall and the second wall and a fourth wall is arranged between the first wall and the second wall opposite the third wall. Wherein the first wall the second wall, the third wall and the fourth wall define the first axial bore. In one embodiment, the first wall and the second wall have a first thickness and the third wall and the fourth wall have a second thickness. In another embodiment, the first thickness is substantially one-half said second thickness. In another embodiment, the first thickness is 2 millimeters and the second thickness is 4 millimeters. The crank assembly may also include a plug coupled to the first arm in the first axial bore adjacent the second end. In one embodiment, the crank assembly may also include a first projection extending from the first wall adjacent the second end, wherein the first projection is forged to close said first axial bore at the second end.

In accordance with another embodiment, a method of fabricating a unitary bicycle crank-arm and spindle is provided. The method includes forming a first elongated arm by 3D forging, the first arm having a solid first end and a first axial bore, the axial bore having a first opening at a second end of the first arm opposite the first end. A first projection is formed on the first arm adjacent the second end. A spindle is formed by extending the first projection and forming a second axial bore in the first projection by 3D forging. The first arm is bent such that the solid end is substantially perpendicular to the first projection. A second elongated arm is formed by 3D forging, the second arm having a sold third end and a third axial bore, the third axial bore having a second opening at a fourth end of the second arm. A second projection is formed on the second elongated arm adjacent the third end. A fourth axial bore is formed in the second projection, wherein the fourth axial bore is sized to receive the spindle opposite the first arm. A first plug is inserted into the first opening and a second plug is inserted into the second opening. The first plug and second plug are coupled to the first arm and second arm by a pressfit, brazing or bonding.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, front, rear, top, bottom, upper, lower etc. do not denote any orientation, order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method of fabricating an integrally formed unitary bicycle crank-arm spindle comprising:
   forming a first elongated arm by three-dimensional (3D) forging, said first elongated arm having a solid pedal end portion and a first axial bore, said first axial bore having a first opening extending through a second end of said first elongated arm opposite said solid pedal end portion, said first axial bore having a closed end opposite the first opening, the closed end being adjacent the solid pedal end portion;
   forming a first projection on said first elongated arm adjacent said second end and opposite said solid pedal end portion;
   forming an elongated spindle from said first elongated arm by extending said first projection and forming a second axial bore in said first projection by 3D forging, the elongated spindle having an end opposite the first arm configured to couple to a second elongated arm, the second axial bore defining an axis of rotation of the first elongated arm when installed on a bicycle, said spindle being unitary and monolithic with said first elongated arm, wherein said second axial bore intersects and is contiguous with said first axial bore;
   bending said first elongated arm, wherein said solid pedal end portion is substantially perpendicular to said first projection;
   forming the second elongated arm by 3D forging, said second elongated arm having a third end and a third axial bore, said third axial bore having a second opening at a fourth end of said second elongated arm;
   forming a second projection on said second elongated arm adjacent said third end; and,
   forming a fourth axial bore in said second projection, wherein said fourth axial bore is sized to receive said spindle opposite said first elongated arm; and
   inserting the spindle in the fourth axial bore to form a crank-arm spindle assembly.

2. The method of claim 1 further comprising:
   inserting a first plug into said first opening, said first plug having third opening, said third opening being substantially co-axial with said second axial bore when the first plug is inserted into said first opening; and,
   inserting a second plug into said second opening, said second plug having a fourth opening, said fourth opening being substantially co-axial with said second axial bore when said second plug is inserted into said second opening.

3. The method of claim 2 further comprising:
   coupling said first plug to said first elongated arm by brazing; and,
   coupling said second plug to said second elongated arm by brazing.

4. The method of claim 2 further comprising:
   coupling said first plug to said first elongated arm by bonding; and,
   coupling said second plug to said second elongated arm by bonding.

* * * * *